US011729145B2

United States Patent
Antoche-Albisor

(10) Patent No.: US 11,729,145 B2
(45) Date of Patent: *Aug. 15, 2023

(54) USER INTERFACE FOR WEB SERVER RISK AWARENESS

(71) Applicant: Microsoft Technology Licensing, LLC, Redmond, WA (US)

(72) Inventor: Danut Antoche-Albisor, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,809

(22) Filed: Jun. 28, 2022

(65) Prior Publication Data

US 2022/0329567 A1 Oct. 13, 2022

Related U.S. Application Data

(63) Continuation of application No. 16/883,641, filed on May 26, 2020, now Pat. No. 11,411,918.

(51) Int. Cl.
*H04L 9/40* (2022.01)
*H04L 67/02* (2022.01)
*H04L 69/22* (2022.01)

(52) U.S. Cl.
CPC .......... *H04L 63/0236* (2013.01); *H04L 63/20* (2013.01); *H04L 67/02* (2013.01); *H04L 69/22* (2013.01)

(58) Field of Classification Search
None
See application file for complete search history.

(56) References Cited

U.S. PATENT DOCUMENTS 8,255,491 B1 * 8/2012 Arzur ..................... H04L 67/08
709/219
8,683,584 B1 * 3/2014 Daswani ............. H04L 63/1408
726/25
10,769,230 B1 * 9/2020 Rousselle ........... G06F 16/9566
(Continued)

OTHER PUBLICATIONS

"Getting Started", Retrieved from: https://developer.chrome.com/docs/extensions/mv3/getstarted/, Feb. 28, 2014, 12 Pages.
(Continued)

*Primary Examiner* — Quang N Nguyen
(74) *Attorney, Agent, or Firm* — Schwegman Lundberg & Woessner, P.A.

(57) ABSTRACT

Web server security is assessed. Some embodiments analyze data exchanged with a web server to determine a risk associated with accessing the web server. For example, one or more of a type of web application accessed via the web server, a type of interpreted language used to implement the web server, and/or a type and/or version of an http server operable on the web server are examined. Based on the analysis, the risk associated with accessing the web server is determined. Some embodiments then block access to the web server based on the analysis. Alternatively, in some embodiments, a user may be alerted to the risk, and then allowed to proceed upon accepting the risks. Some embodiments share the determined risk assessment with other client devices via a web server risk data store.

20 Claims, 12 Drawing Sheets

(56) References Cited

U.S. PATENT DOCUMENTS

| | | | |
|---|---|---|---|
| 2009/0119769 A1* | 5/2009 | Ross | G06F 21/56 726/13 |
| 2016/0078231 A1* | 3/2016 | Bach | H04L 67/55 726/25 |
| 2021/0097168 A1* | 4/2021 | Patel | G06F 21/566 |
| 2021/0288735 A1* | 9/2021 | Yamagishi | H04N 21/4363 |

OTHER PUBLICATIONS

U.S. Appl. No. 11/411,918, filed Aug. 9, 2022.

* cited by examiner

USER INTERFACE FOR WEB SERVER RISK AWARENESS

CROSS-REFERENCE TO RELATED APPLICATION

This application is a continuation of U.S. application Ser. No. 16/883,641, filed May 26, 2020, titled "User Interface for Web Server Risk Awareness" and issued as U.S. Pat. No. 11,411,918 on Aug. 9, 2022, which application is incorporated herein by reference in its entirety.

BACKGROUND

Attacks on consumers and businesses by malicious web sites are becoming increasing common. According to a 2017 report, some organizations experience cyber-crime costs relating to malware, web-based attacks, phishing and social engineering attacks, and stolen devices. Additionally, some organizations experience costs relating to denial of services, malicious insiders, and malicious code. In some cases, these costs are the result of reputable web servers becoming infected with malware or other nefarious code. Infection of web servers can be a result of poorly maintained web servers, such as web servers that run relatively old versions of software with known vulnerabilities. Infection can also result from the use of particular software languages, frameworks, or libraries that are inherently less safe due to their fundamental design. Thus, improved methods of reducing risks associated with accessing web servers are necessary.

DETAILED DESCRIPTION

Figure 1:
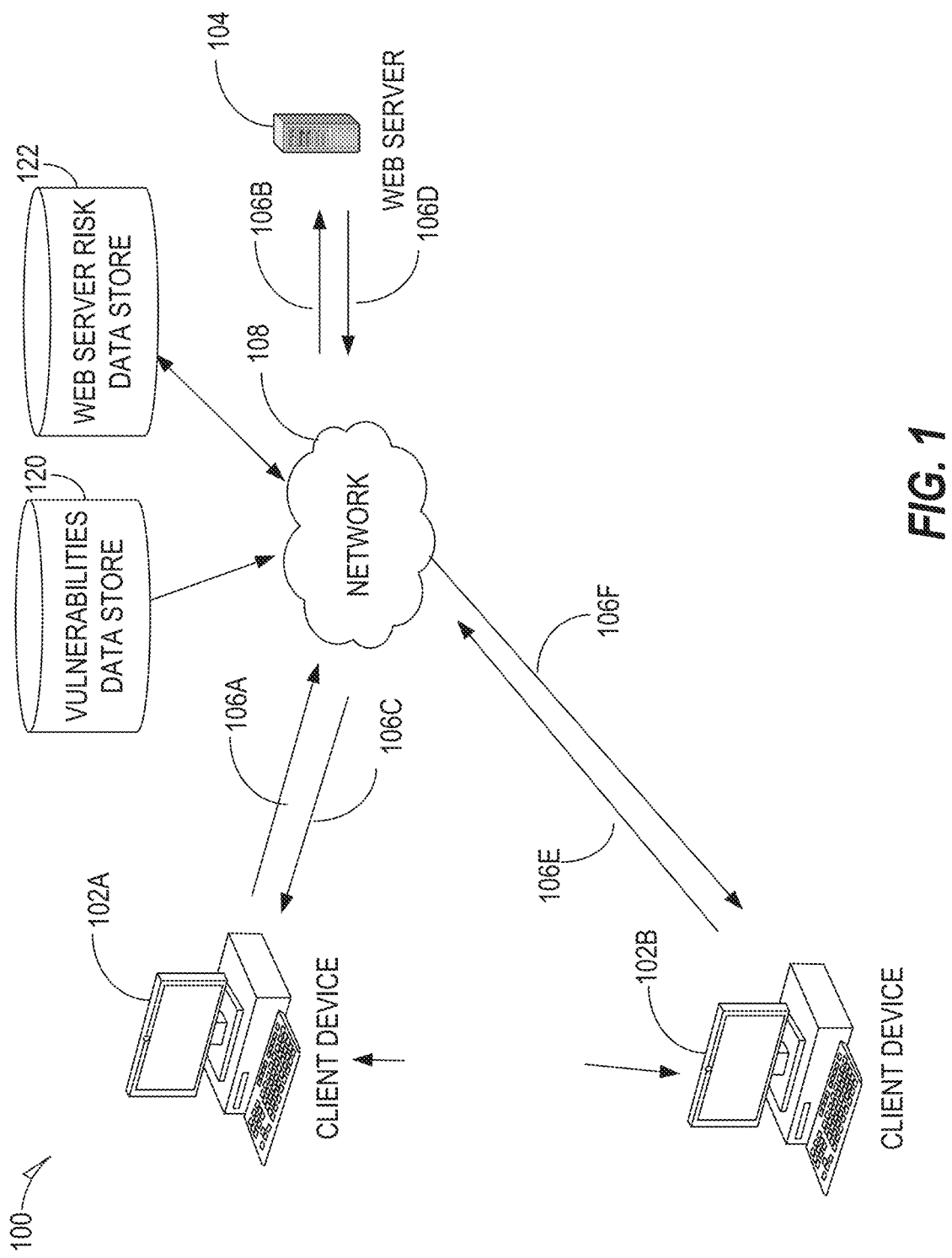
FIG. 1 is an overview diagram of a system implementing one or more of the disclosed embodiments.

Disclosed are embodiments for determining a risk associated with accessing a resource via a network. Access to resources via a network is commonly accomplished via use of the hypertext transfer protocol (HTTP). The hypertext transfer protocol provides for a representational state transfer (REST) based interface. The interface defines a method for a client device to open a connection with a second device via a network. The second device is, in some embodiments, a server or commonly referred to as a web server. The connection is established according to communication parameters specified by a Uniform Resource Locator (URL). Once the connection is established, the client device requests a resource from the second device by name. The second device then responds, via one or more network messages, the one or more network resources including information including the requested resource.

By receiving and operating on data provided by the second device, some risk is imposed on the client device. For example, data received from the second device can include malicious code that, once executed by the client device, can take control of the client device and perform actions detrimental to the client device. For example, if the client device can be compromised based on data it received from the second device, resource accessible to the client device, such as confidential documents or other information, can be compromised and/or damaged. Additionally, compromised websites can be used to host phishing attacks, impersonating legitimate services or be employed to infect legitimate services with malware. These infections can steal sensitive customer information such as, but not limited to, usernames, passwords, banking and credit card information or critical identity information.

Thus, to ensure a secure environment, not only should the client device utility good security practices, but also the second device, from which the client device receives data, should also follow industry standard security guidelines.

Unfortunately, many web servers or other devices that make resources available via the Internet are not well maintained, or at least include one or more vulnerabilities, making them more likely to be compromised by a nefarious actor. This presents an undue risk to client devices accessing those resources. Moreover, it is not necessarily clear to a user accessing the web server that such risks are being imposed on them by the use of their client device to access those resources. Since the user is not necessarily aware of the risks, they may be more likely to access such resources, and exercise less caution when selecting between different web servers to access, if they are unable to differentiate between risks imposed by each of their choices. Furthermore, to the extent the risks imposed on users by poor web server maintenance are not visible, web server providers are less incented to provide proper maintenance and eliminate these risks. Thus, the current state of technology presents a technical problem in that the level of diligence applied to maintenance of web servers presents a level of risk to users, and that level of risk is not well understood by either users or in some examples, the organizations maintaining the web servers themselves.

The disclosed embodiments provide methods and systems for detecting these risks, and then alerting users to the risks, and/or taking action to prevent such risk from being imposed. By detecting the risks and alerting the users, the disclosed embodiments provide a technical solution to the technical problem described above. In particular, the disclosed embodiments operate by, at least in part, analyzing information provided to a client device by a second device. By providing information to the client device, the second device indicates one or more characteristics of the second device itself, including its software configuration, security practices, and other information relevant to determining a risk associated with accessing the second device. Some embodiments provide a database of vulnerability found on web servers. The parties responsible for maintaining these web servers can subscribe to this data (e.g. via a portal application), or subscribe to push notifications (e.g. email, text) when problems are identified on their web sites.

In some embodiments, the characteristics of the second device include features such as a type of web server software being used by the web server, a type of web application providing data via the web server, a type of interpreted language employed by the web server (e.g. PHP, Perl, Python, Ruby, Go, Node, ASP, etc.), frameworks and or libraries used by the web server, or other characteristics. Some embodiments employ a signature-based approach to identifying particular web server software, web application types and/or versions, frameworks, or libraries. For example, some web applications can be identified based on a pattern of URLs retrieved by the web application. Some of the disclosed embodiments employ a client-side extension to a web browser that monitors these URL retrievals, and compares the monitored URL retrievals to known URL retrieval patterns stored in a data store. If the monitored retrievals match a retrieval pattern of a known web application, then some of the disclosed embodiments conclude that the web server is running the known web application. In some cases, the pattern of URL retrievals can be used not only to identify a particular type of web application, but also a particular version of the web application, since different versions of the same web application often vary in their pattern of URL retrieval. Similar distinctions are sometimes possible when detecting a framework or library employed by a web server.

Once the particular web application, web server, libraries, frameworks, scripting language, and other characteristics of a web server are known, each of these characteristics can be mapped to a level of risk associated with it. For example, some embodiments maintain a vulnerability data store that provides a mapping from particular types or versions of web server software, web applications, frameworks, libraries, and other characteristics to a level of risk.

These risk scores are then aggregated into an overall assessment of a risk imposed by interaction with the second computer.

The disclosed embodiments then, based on a security policy, determine an action to perform based on the assessment of risk. If the risk is relatively low, no particular action is taken, at least in some embodiments. A moderate risk results, under some security policies, in a warning to be displayed to a user before further interaction with the second device is facilitated. If the user acknowledges that they understand the risk and still wish to proceed, a dialog is provided allowing such input to be provided. Under certain severe risk circumstances, at least some security policies may prevent access entirely, regardless of any user's desire to continue.

Thus, by alerting users to the risks imposed by accessing a web server, the disclosed embodiments provide a technical solution to the technical problem discussed above. Because a user is more aware of risks imposed by a web server, the user is more empowered to make different choices as to which web servers they access, and which web servers are avoided. This can result in the user operating with a reduced level of risk relative to solutions in place today. Furthermore, by making these risks more visible to the user, some additional incentives are provided to web server operators to apply more diligence in maintaining their web servers. For example, while a web server operator may allow their web server software to age without a recent update if no feedback is received from their user community, a user community that is frequently warned about risks imposed by their relatively old web server software may decide to upgrade the software sooner than they otherwise would have. This improved level of maintenance reduces risk imposed on the community in general.

In addition, some embodiments share risk information on web services via a web server risk data store. A client device that analyzes communications with a web server and determines a risk score for the web server, stores information relating to the analysis in the data store, that is also accessible to other client devices. Before these other client devices connect to the web server, they first check, in these embodiments, to determine if a risk analysis of the web server has already been performed, and if so, the results of said analysis. These other client devices are then made aware of the risk of connecting to a particular web server without necessarily being required to connect or exchange any data with said web server. This improves security of these devices and also reduces processing overhead associated with developing a risk score for a web server.

FIG. 1 is an overview diagram of a system 100 implementing one or more of the disclosed embodiments. The system 100 includes a client device 102*a*, a client device 102*b*, and a web server computer 104. The client device 102*a* and the web server computer 104 communicate via network messages 106*a-d* via a network 108. For example, the client device 102*a* requests, in some embodiments, data from the web server computer 104 via hypertext transport protocol (HTTP). The web server computer 104 then provides a response (e.g. via network messages 106*c-d*) to the client device 102*a*. Note that while the term "client device" is used throughout this disclosure to refer to a device accessing a web server, the term is not intended to limit the contemplated devices considered client devices to particular types of devices, such as mobile phones, laptop, or other traditional client devices. Instead, the term "client device" within the context of this application is used to describe a relationship between the "client" device and a web server computer, such as the web server computer 104. For example, by being a client device with respect to a web server, the client device requests data from the web server. For example, in embodiments that facilitate communications between the client device and web server via the hypertext transfer protocol (HTTP), the client device requests data via an HTTP "Get" request, and the web server then responds with an HTTP response message to the HTTP "Get" request. Other methods of transferring data via HTTP are also contemplated by the disclosed embodiments (e.g. "Post").

The disclosed embodiments determine a risk assessment of the web server computer 104 based on the network messages 106*a-d* exchanged between the client device 102*a* and the web server computer 104. The client device 102*a* also relies, in some embodiments, on vulnerability information included in a vulnerability data store 120. For example, the vulnerability data store 120 defines, in some embodiments, mappings between particular properties or types of web servers, web applications, http header field values, and other indications provided by the web server computer 104, to relative risks associated with accessing a computer including those properties or types. The vulnerability data store 120 indicates, in some example embodiments, that a version of Apache web server previous to version 2.2 includes certain vulnerabilities that impose a particular risk on client devices accessing these versions of Apache. From this information, the client device 102*a* scores, in some embodiments, the web server computer 104 to indicate a level of risk associated with accessing it.

While FIG. 1 shows the vulnerability data store 120 as remote from the client device 102a and client device 102b, in some embodiments, at least a portion of the vulnerability data store 120 is downloaded (e.g. periodically) so as to reside locally at the client device 102a and/or the client device 102b.

In some embodiments, the risk assessment determined based on interactions between client device 102a and web server computer 104 are applied prospectively to an exchange of messages 106e-f between the client device 102b and the web server computer 104. For example, if the client device 102a determines the web server computer 104 represents a first level of risk, the client device 102a writes information relating to its determination to the vulnerability data store 120. In these embodiments, before connecting with the web server computer 104, the client device 102b determines, based on the information written the vulnerability data store 120 by the client device 102a, in some embodiments, whether to exchange data with the web server computer 104 based on the assessed first level of risk, and a security policy in effect at the client device 102b.

Some embodiments further implement a web server risk data store. The web server risk data store 122 stores, in these embodiments, results of an analysis performed by the client device 102a and/or client device 102b of data provided by the web server computer 104. For example, upon determining that the web server computer 104 represents a particular level of risk, the client device 102a stores this information, along with information identifying the web server computer 104, to the web server risk data store 122. In some embodiments, the web server risk data store 122 is a cloud-based data store, that is accessible via the Internet to the client device 102a. In some other embodiments, the web server risk data store 122 is implemented as a back-office database that is accessible to a particular set of client devices.

In these embodiments, before connecting to a particular web server computer such as the web server computer 104, a client device (e.g. client device 102a and/or client device 102b) queries the web server risk data store 122 to determine if a risk of accessing the web server is already known. This information is then used, in some embodiments, to warn/prompt a user of a potential risk and/or block access to the web server if called for by the user's security policy.

Figure 2:
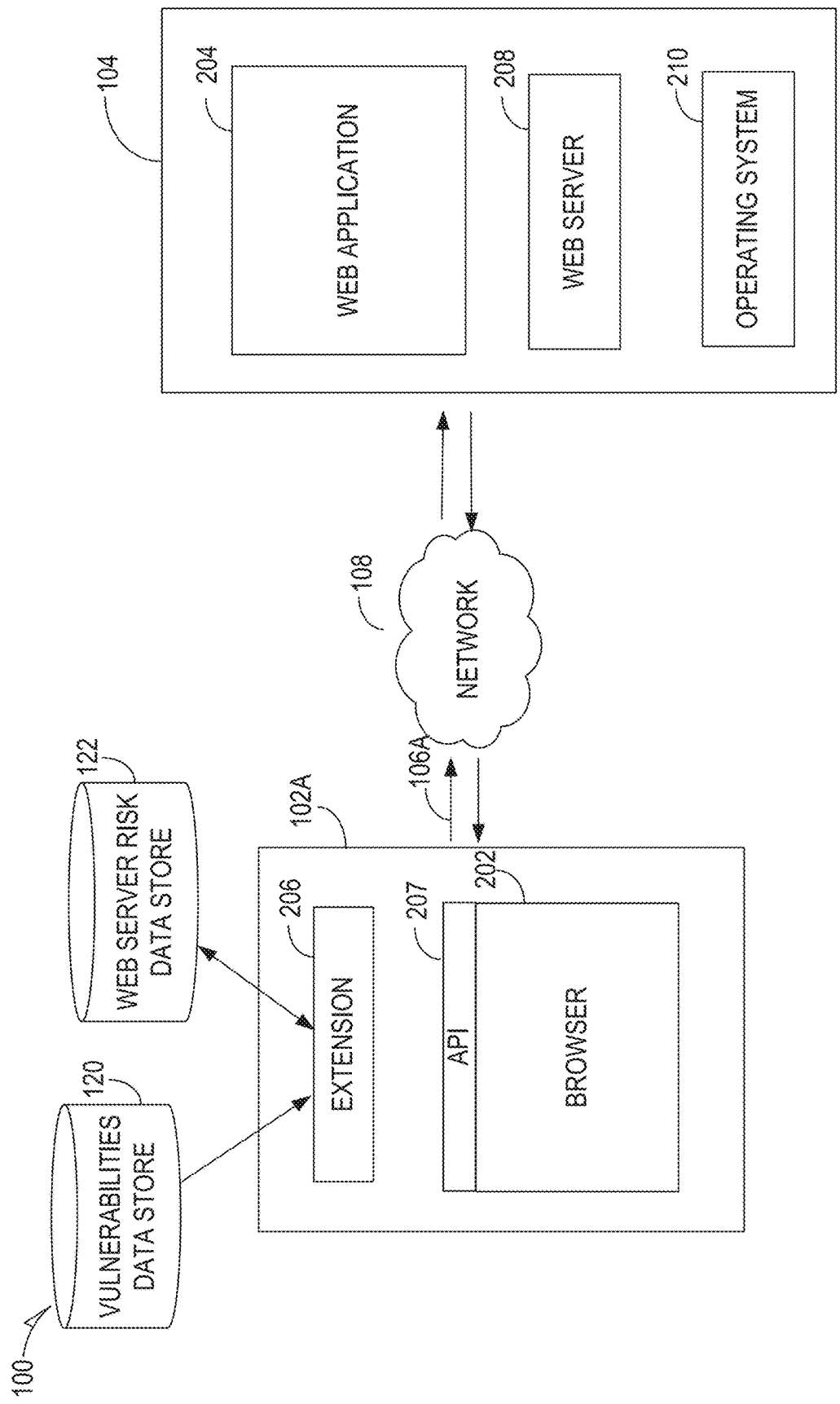
FIG. 2 is an expanded view of the system of FIG. 1.

FIG. 2 is an expanded view of the system 100 of FIG. 1. As in FIG. 1, the system 100 is shown to include the client device 102a and the web server computer 104. FIG. 2 shows that the client device includes a browser application 202. The browser application 202 communicates with a web application 204 running on the web server computer 104. In at least some embodiments, the browser application 202 communicates via the HTTP protocol with the web application 204. The browser application 202 can be any application, but in various embodiments, is the Microsoft Edge® Browser, Google® Chrome® Browser, the Safari® browser produced by Apple® Computer, or any other commercial browser. The client device 102a also includes an extension 206. The extension 206 integrates with the browser application 202. In some embodiments, the browser application 202 provides an application programming interface (API) 207 that provides for the integration between the browser application 202 and the extension 206. Via the API 207, the extension, in some embodiments, intercepts communications between the browser application 202 and the web application 204. The extension intercepts the communications so as to decode and analyze the web application and other components of the web server computer 104. In some embodiments, one or more of the functions attributed to the extension 206 in this disclosure are performed instead by the browser application 202.

In some embodiments, the extension 206 derives one or more characteristics of a web server application 208 running on the web server computer 104. For example, an http response message (e.g. 106c) includes, in some embodiments, indicators of a type and/or version of the web server application 208. Several components of the web server computer 104 work together to generate network messages which are provided back to the client device 102a. For example, some messages are initially generated, in some embodiments, by the web application 204. For example, the web application 204 generates, in some embodiments, a response message to a request message that the web application 204 receives from the browser application 202. The web application 204 passes the message to the web server application 208. The web server application 208 then sends the message, via a network protocol, over the network 108 to the client device 102a.

The extension 206 also determines, in some embodiments, one or more characteristics of an operating system 210 running on the web server computer 104. For example, the extension 206 determines, in various embodiments, a type of the operating system (e.g. a publisher of the operating system, such as Microsoft® or Red Hat®, a name of the operating system, such as "Windows," or "Linux"), or a version of the operating system. In some embodiments, the extension 206 determines, by analyzing one or more of the network messages 106a-d, a type of interpreted language employed by the web application 204. For example, the extension determines, in some embodiments, whether the web application 204 is implemented using PHP, C# or ASP/.NET, Java, Phyton, Ruby, or another interpreted language.

In some embodiments, the extension 206 derives information relating to one or more plugins, one or more themes, or one or more extensions used by the web application 204. For example, as discussed further below, at least some of the disclosed embodiments employ one or more of URL sequence-based signatures, document object model (DOM) object identifier signatures, or content signatures to identify plugins, themes, or extensions used by the web application 204.

In some embodiments, the extension 206 analyzes one or more of the network messages 106a-d to determine any client executable frameworks, which are frameworks referenced by the network messages for execution on the client device 102a. For example, some network messages reference client-side java script frameworks or libraries that cause execution of said frameworks/libraries on the client device 102a when a web page defined by the network message is displayed or otherwise rendered. Some embodiments analyze the one or more network messages to identify a code injection or insert.

The extension 206 then determines a relative level of risk associated with the web server computer 104. The extension 206 may map the information obtained from the network messages 106a-d to one or more levels of risk based on information included in the vulnerability data store 120.

As described above, in some embodiments, the extension 206 assesses a risk of accessing the web server computer 104 by analyzing data received from the web server computer 104. In some of these embodiments, the client device 102a and/or extension 206 queries the web server risk data store 122 before communicating with the web server computer 104. For example, another client device (e.g. client device 102*b* or other client device) may have previously interacted with the web server computer 104 and performed a risk assessment. This other client device also writes or transmits, in some embodiments, results of its analysis to the web server risk data store 122, which facilitates sharing of this information with other client devices (e.g. client devices 102*a* and/or 102*b*). This allows these client devices to obtain the risk assessment prior to even attempting access of the web server computer 104, improving security of the client devices by potentially preventing any access of risky web server computers. By sharing risk information across multiple client devices, overhead imposed on client computers is also reduced, because each client computer is not necessarily required to repeat a security analysis of a web server computer if that analysis has previously (and in some embodiments, recently) been performed.

If the client device 102*a* and/or extension 206 is unable to locate risk information for a particular web server computer 104 (e.g. via URL and/or address information discussed below with respect to FIG. 6), then the client device 102*a* analyzes the network messages as discussed above to determine the risk associated with the web server computer 104 itself. After the risk is determined, this information is then, at least in some embodiments, written to the web server risk data store 122, so as to make the information available to other client computers, as discussed above.

After a risk associated with the web server computer 104 is determined by the client device 102*a*, (e.g. either by analyzing data exchanged with the web server computer 104, or by obtaining risk information from the web server risk data store 122), the client device 102*a* takes an action, depending on a security policy that is applied to the client device 102*a* and/or a computer account having an action session on the client device 102*a*, as discussed further below.

Figure 3A:
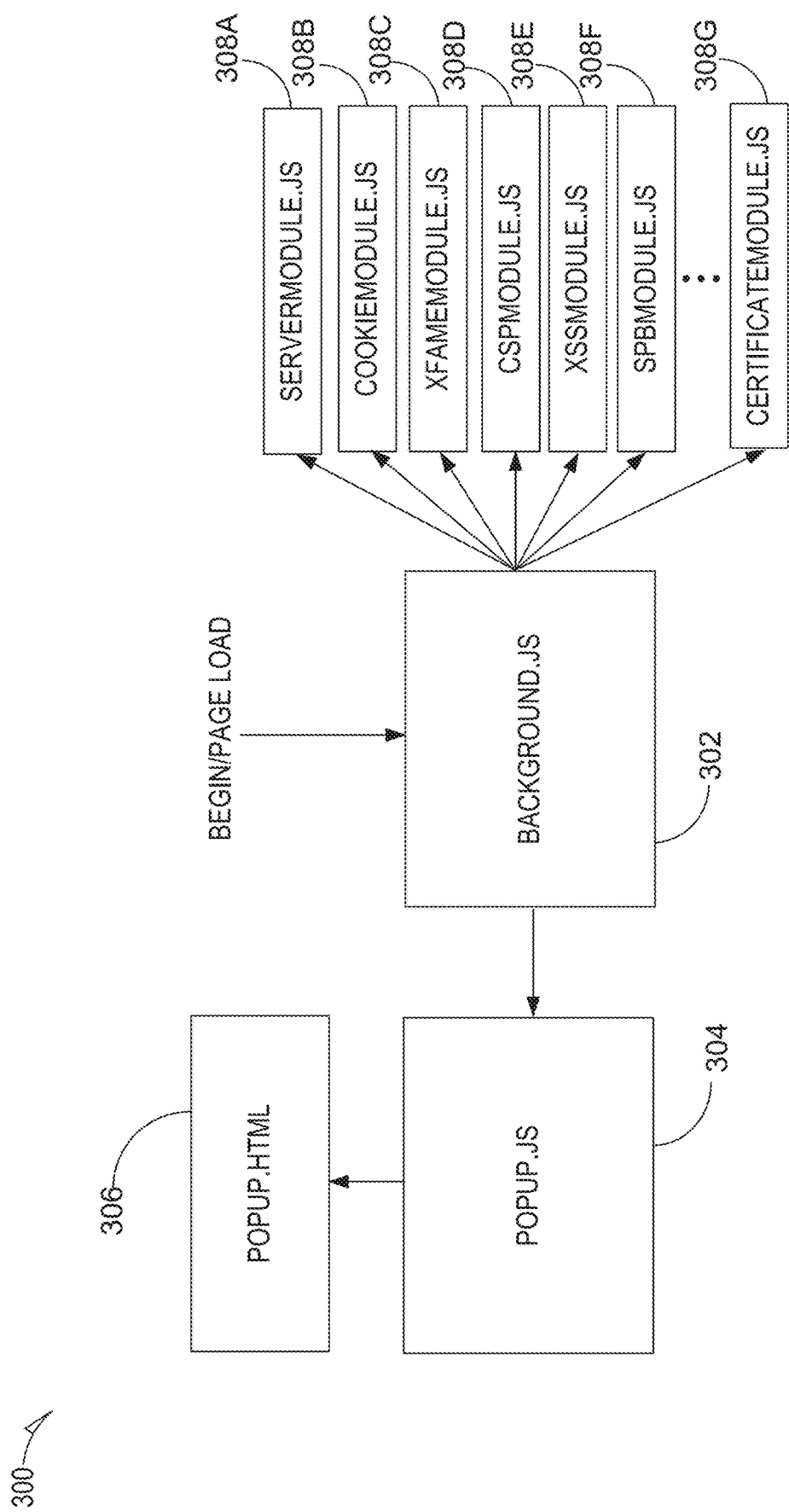
FIG. 3A is a block diagram showing an example architecture of an extension.

FIG. 3A is a block diagram showing an example architecture of an extension. In some embodiments, the architecture 300 is implemented by the extension 206, discussed above with respect to FIG. 2. FIG. 3A shows a background.js file 302 that includes a method registered as a central notification point for a page load within the browser application 202. For example, the method is registered, in some embodiments, via the API 207. Code within the background.js file 302 includes a notification method that is invoked when the browser application 202 loads a new page defined by one or more of the network messages 106*a-d*. One or more methods defined by the background.js file invoke one or more other code modules 308*a-g* to parse one or more different portions of an HTTP response message included in the network message 106*c*.

In some embodiments, a method defined by the background.js module determines a risk score of a web server, and its compatibility with a security policy. In some embodiments, the risk score is based on information provided by one or more of the modules 308*a-g*. For example, in some embodiments, one or more of the modules 308*a-g* are invoked by a method included in background.js. In some embodiments, if a method included in background.js detects a particular type of http header, a corresponding module included in modules 308*a-g* is invoked to parse the header and return a score to the method in background.js. Once the http response parsing has been completed, code included in background.js generates a security score for the web site based, at least in part, on the one or more scores returned from modules 308*a-g*.

In response to the security score meeting one or more criterion, a method defined by the background.js module displays a window defined by a method included in the popup.js module 304. The method generates a html file 306 which is displayable within a browser application, such as the browser application 202 discussed above with respect to FIG. 2. An example window is discussed below with respect to FIG. 4A.

Figure 3B:
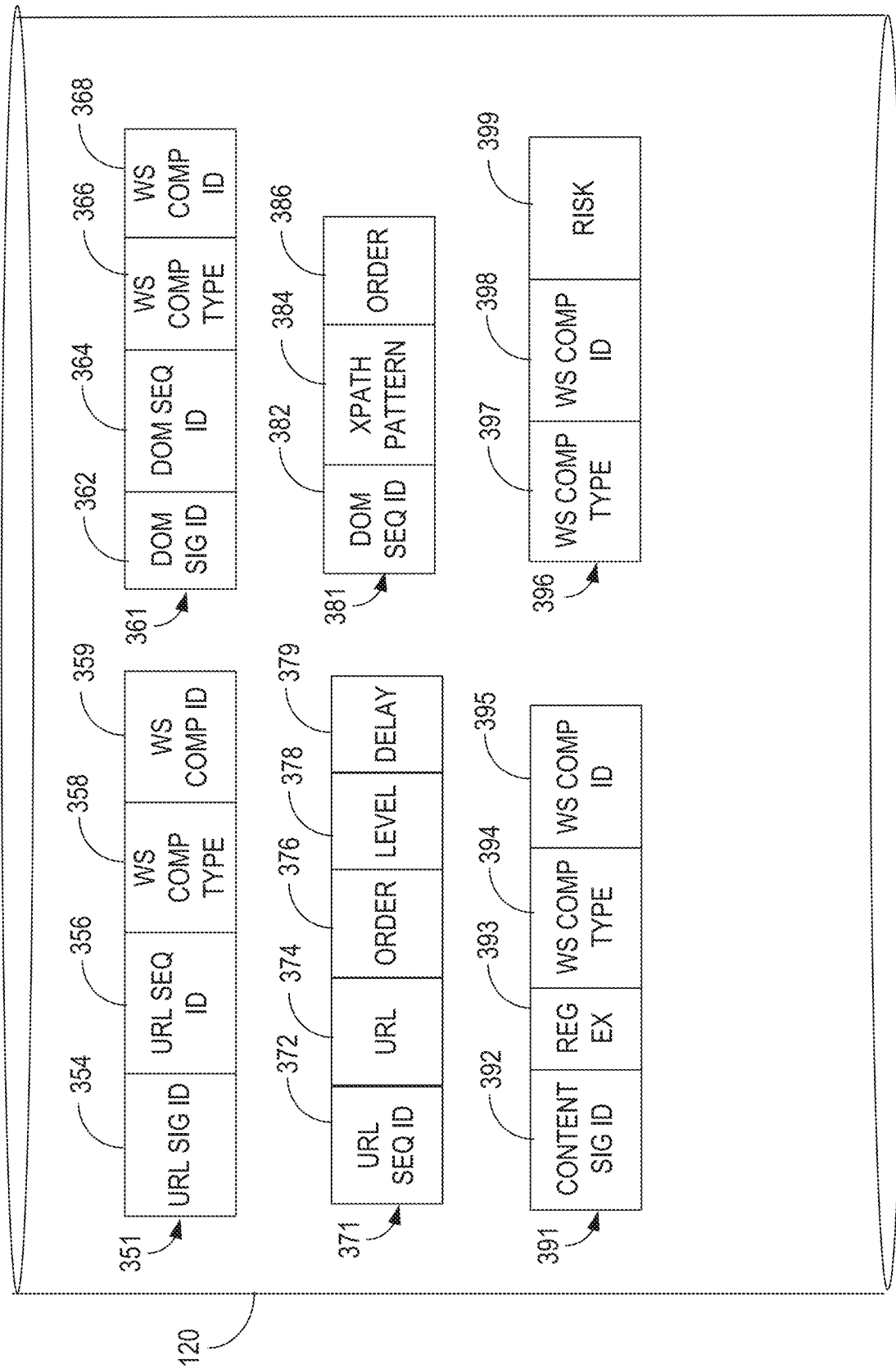
FIG. 3B shows example data structures included in a vulnerability data store in at least some embodiments.

FIG. 3B shows example data structures included in a vulnerability data store 120 in at least some embodiments. While the example data structures are discussed below as relational database structures, one of skill would understand that the disclosed embodiments are not limited to use of relational database structures and can utilize a variety of other data structure architectures. For example, non-structured data stores, or traditional memory data structures such as arrays, linked lists, trees, or other data structures are used in some of the disclosed embodiments.

FIG. 3B shows a URL signature table 351, a document object model (DOM) signature table 361, a URL sequence table 371, a DOM sequence table 381, and a content signature table 391.

The URL signature table 351 includes a URL signature ID field 354, URL sequence identifier field 356, a web server computer component type field 358, and a web server computer component id field 359. The URL signature ID field 354 uniquely identifies a signature of a web server component. The URL sequence identifier field 356 identifies a URL sequence used by the signature. The web server computer component type field 358 identifies a type of web server computer component identified by the signature. For example, the web server computer component type field 358 indicates whether the signature (identified by the URL signature ID field 354) identifies a web application, a web application of a particular version, a framework in use by the web server computer, a library in use by the web server computer, an interpreted language in use by the web server computer, a type of http web server in use by the web server computer, or other web server computer component type. The web server computer component id field 359 identifies the particular type of web server computer component. For example, if the field 358 indicates the signature identifies a type of scripting language in use by the web server computer, the web server computer component id field 359 indicates if the scripting language is PHP, Node, Go, Ruby, Perl, python, or other web server scripting or interpreted language type.

The DOM signature table 361 includes a DOM signature ID field 362, DOM sequence identifier field 364, web server computer component type field 366, and a web server computer component identifier field 368. The DOM signature ID field 362 uniquely identifies a DOM signature. The DOM sequence identifier field 364 uniquely identifies a DOM sequence described by DOM sequence table 381, discussed below. The web server computer component type field 366 operates in a similar manner to the web server computer component type field 358, but identifies a type of component identified by the DOM signature (which is itself identified by field 362). The web server computer component identifier field 368 operates in a similar manner to field 359, discussed above, but identifies a component identified by the DOM signature (identified by field 362).

The URL sequence table 371 includes a URL sequence identifier field 372, URL field 374, order field 376, a level field 378, and a delay field 379. The URL sequence identifier field 372 uniquely identifies a URL sequence (e.g. via a unique number). The URL field defines a URL included in the URL sequence. The order field 376 indicates an order in which the URL (defined by field 374) appears in the sequence relative to other URLs in the sequence. The level field 378 identifies a nesting level of the URL (defined by field 374). Thus, for example, if the URL is referenced by content identified by a second URL, and the second URL is referenced at a top or first level, then the level field 378 would indicate a level of two (2). The delay field 379 indicates a typical time period between a fetch or retrieval of the URL specified by URL field 374, and a previous URL in the order specified by field 376. Some embodiments match not only a sequence of URLs retrieved but also time delays between those retrievals to obtain a "fingerprint" of particular web server computer components.

The DOM sequence table 381 includes a DOM sequence identifier field 382, xpath pattern field 384, and an order field 386. The DOM sequence identifier field 382 uniquely identifies a DOM xpath pattern sequence. The xpath pattern field 384 defines a pattern (e.g. defines one or more element types and attributes of said element(s), and/or type and/or attributes of parent or ancestor of the one or more element(s)) that matches xpath information included in the DOM sequence (identified by the field 382). The order field 386 identifies an order in which the DOM xpath pattern appears in the sequence, relative to other DOM xpath patterns included in the sequence.

The content signature table 391 includes a content signature identifier field 392, a reg ex field 393, a web server computer component type field 394, and a web server computer component id field 395. The content signature identifier field 392 uniquely identifies a content-based signature. The reg ex field 393 defines a regular expression that is evaluated against content to determine if the content matches the signature. The web server computer component type field 394 operates in a similar manner as fields 358 and/or 366 discussed above, except refers to a component type identified by the content signature. The web server computer component id field 395 operates in a similar manner as the field 359 and 368 discussed above, except identifies a web server component identified by the content signature.

The risk score table 396 includes a web server computer component type field 397, a web server component identifier field 398, and a risk field 399. The risk score table 396 associates particular risk values with particular web server computer components and versions of those components. For example, the risk score table 396 defines in some embodiments, a first level of risk associated with a first version of a particular web application, and a second level of risk associated with a second version of the particular web application. The web server computer component type field 397 and web server component identifier fields work, either individually or in combination, to identify a particular web server computer component. The risk field 399 identifies a level of risk associated with the identified component.

Figure 3C:
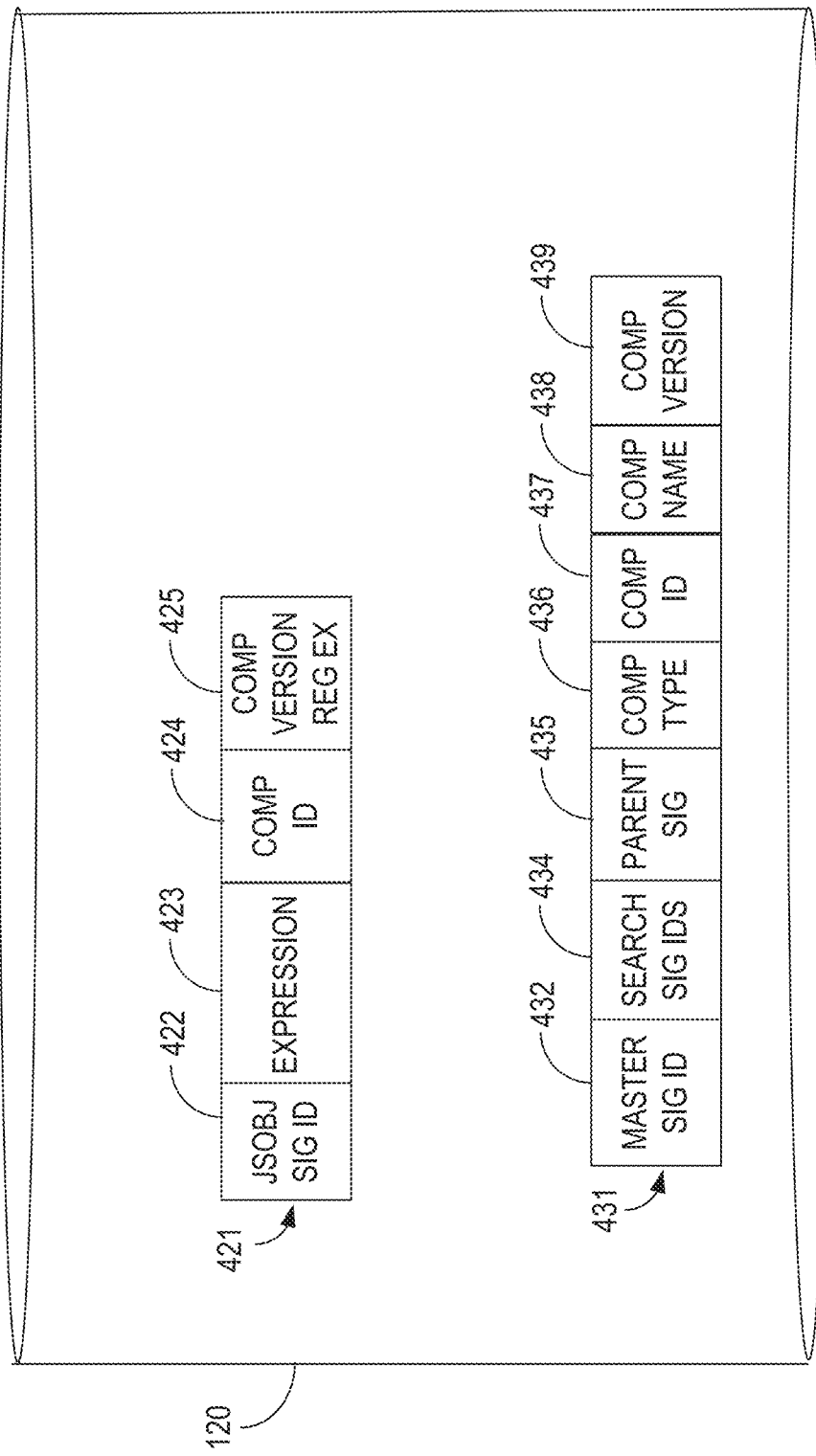
FIG. 3C shows example data structures included in the vulnerability data store in at least some embodiments.

FIG. 3C shows additional example data structures included in a vulnerability data store 120 in at least some embodiments. As with FIG. 3B, while the example data structures are discussed below as relational database structures, one of skill would understand that the disclosed embodiments are not limited to use of relational database structures and can utilize a variety of other data structure architectures. For example, non-structured data stores, or traditional memory data structures such as arrays, linked.

FIG. 3C shows a JavaScript object table 421 and a master signature table 431. The JavaScript object table 421 includes a JavaScript object signature id field 422, expression field 423, component id field 424, and a component reg ex field 425. The object signature id field 422 uniquely identifies a signature defined by a row of the JavaScript object table. The expression field 423 defines an expression (e.g. in JavaScript code form) to be injected into a page. When the page executes, the injected code operates to return values to the disclosed embodiment for evaluation. In some embodiments, the injected code determines whether a particular framework, library, or plugin is present in a network message or page provided by a web server computer. The component id field 424 identifies a component of a web server computer that exists if the expression field 423 evaluates to a true value. The component version reg ex field 425 defines a regular expression that can extract a version number of the identified component (identified via field 424).

The master signature table 431 includes a master signature id field 432, search signatures ids field 434, a parent signature id field 435, a component type field 436, a component identifier field 437, a component name field 438, and a component version field 439.

The master signature id field 432 uniquely identifies a master signature. The search signatures ids field 434 defines a list of one or more signatures that must all match in order for the master signature to identify a component or component property. The parent signature id field 435 identifies a parent signature of the present signature. Embodiments utilizing the master signature table 431 can implement data driven conditional logic via multiple levels of signatures. In these embodiments, if a parent signature matches, then child signatures of the parent are evaluated to determine a match. The child signatures are not evaluated if their parent signatures do not evaluate to a true value. The component type field 436 defines a component type that is identified if the master signature matches. In some embodiments, one or more parent signatures do not identify a component via the component type field 436. These one or more parent signatures instead rely on child signatures to uniquely identify a component. This is also the case with component identifiers, names, and versions identified by each of the component identifier field 437, component name field 438, and component version field 439 respectively.

Figure 4A:
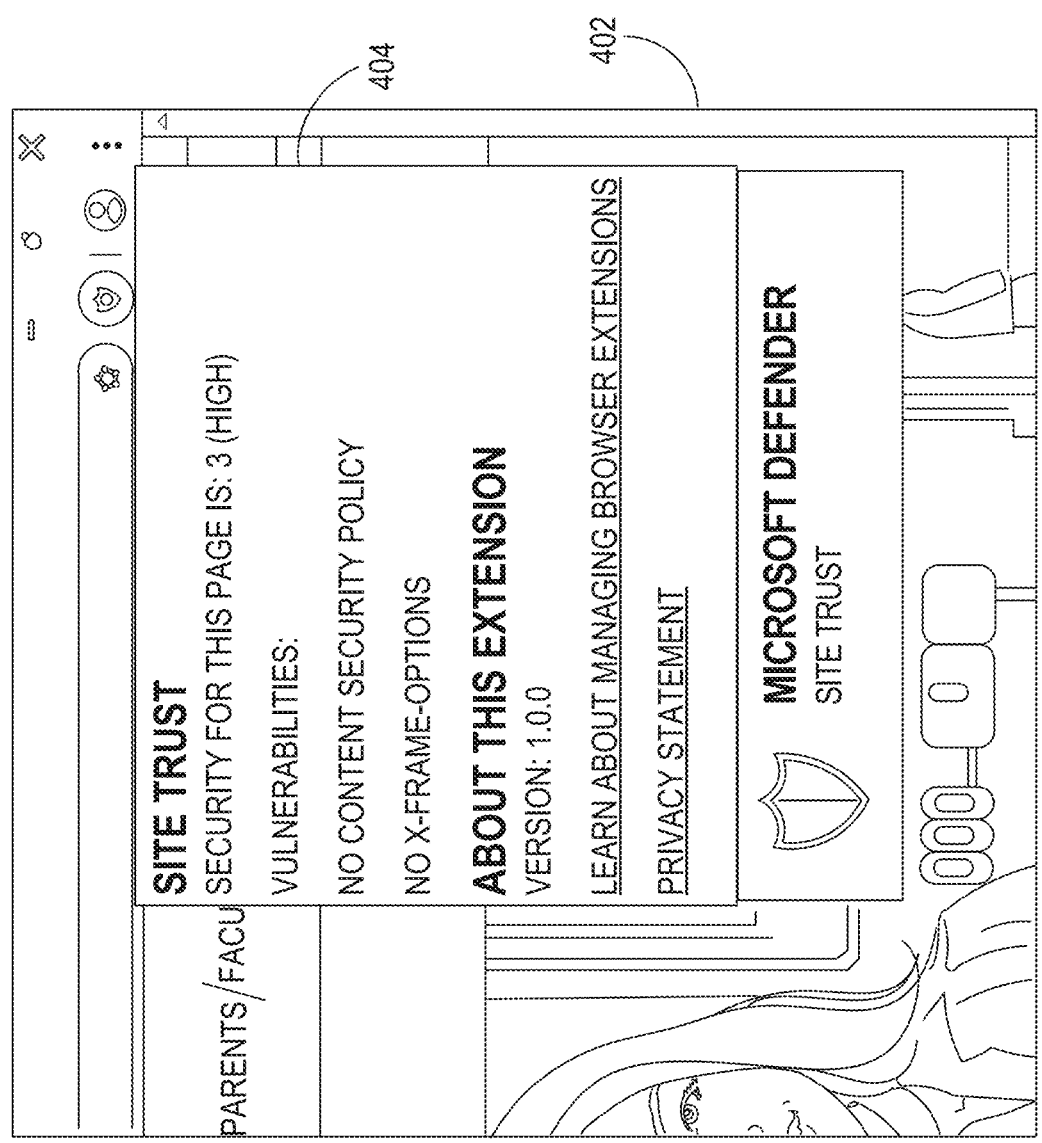
FIG. 4A shows an example user interface that is implemented in one or more of the disclosed embodiments.

FIG. 4A shows an example user interface that is implemented in one or more of the disclosed embodiments. The example user interface 400 is displayed via a browser application, shown in FIG. 4A as 402. The browser application 402 of FIG. 4A is equivalent to the browser application 202 of FIG. 2 in at least some embodiments. The user interface 400 includes a window 404. The window lists one or more (in this case, two) security indicators 406a and 406b of a web site requested by the browser application 402. For example, the browser application 402 requests access to the web site, in at least some embodiments, in response to receiving input defining a uniform resource locator (URL) referencing the website. The window 404 also includes a risk score indication 408 for the web site. The risk score indication 408 is based, in at least some embodiments, on a number of security indicators displayed in the window 404.

Figure 4B:
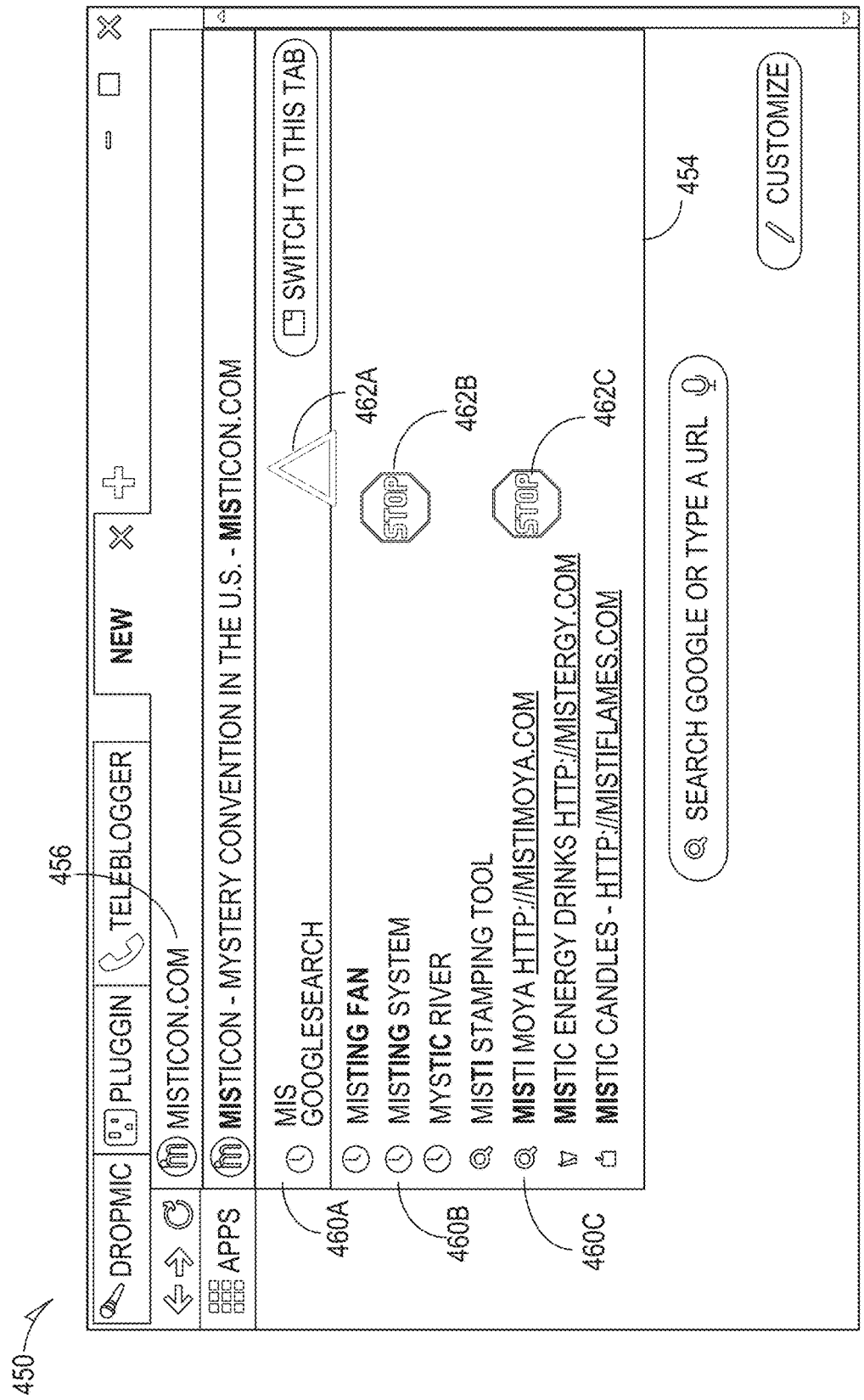
FIG. 4B shows an example user interface that is implemented in one or more of the disclosed embodiments.

FIG. 4B shows an example user interface that is implemented in one or more of the disclosed embodiments. The user interface 450 of FIG. 4B shows an address suggestion box 454 providing suggestions for URLs as a user types into the address bar 456. The address suggestion box 454 includes suggestions, shown as suggestion 460A, suggestion 460B, and suggestion 460C. Associated with some of the suggestions displayed are risk indicators. For example, the user interface 450 shows risk indicator 462A, risk indicator 462B, and risk indicator 462C. Each of the risk indicators 462A-C correspond to one of the suggestions 460A-C. Some embodiments obtain risk information on the suggestions 460A-C displayed in the address suggestion box 454 from a web server risk data store (e.g. web server risk data store 122, discussed above with respect to FIG. 1 and FIG. 2). From this obtained risk information, some of the disclosed embodiments display an indicator of risk associated with a particular suggestion, as demonstrated by user interface 450. For example, suggestions associated with a relatively high risk are tagged with an indicator, such as a stop sign, indicating that visiting the suggested site is not recommended. (Some embodiments will simply not display such suggestions at all). Suggestions associated with a moderate level of risk may display an indicator consistent such moderate risk, like a warning sign as is shown with respect to risk indicator 462A. The disclosed embodiments are not limited to the specific example risk indicators displayed in the example of FIG. 4B. Embodiments utilizing a web server risk data store (e.g. web server risk data store 122 discussed above) are able to display security risk indicators such as any of risk indicators 462A-C without necessarily visiting the site themselves (e.g. connecting and/or downloading any data from the site). These embodiments may also advise users before the user actually requests information from the web site. In some embodiments, the risk indicators 462A-C are displayed via the extension 206, discussed above with respect to FIG. 2.

Figure 5:
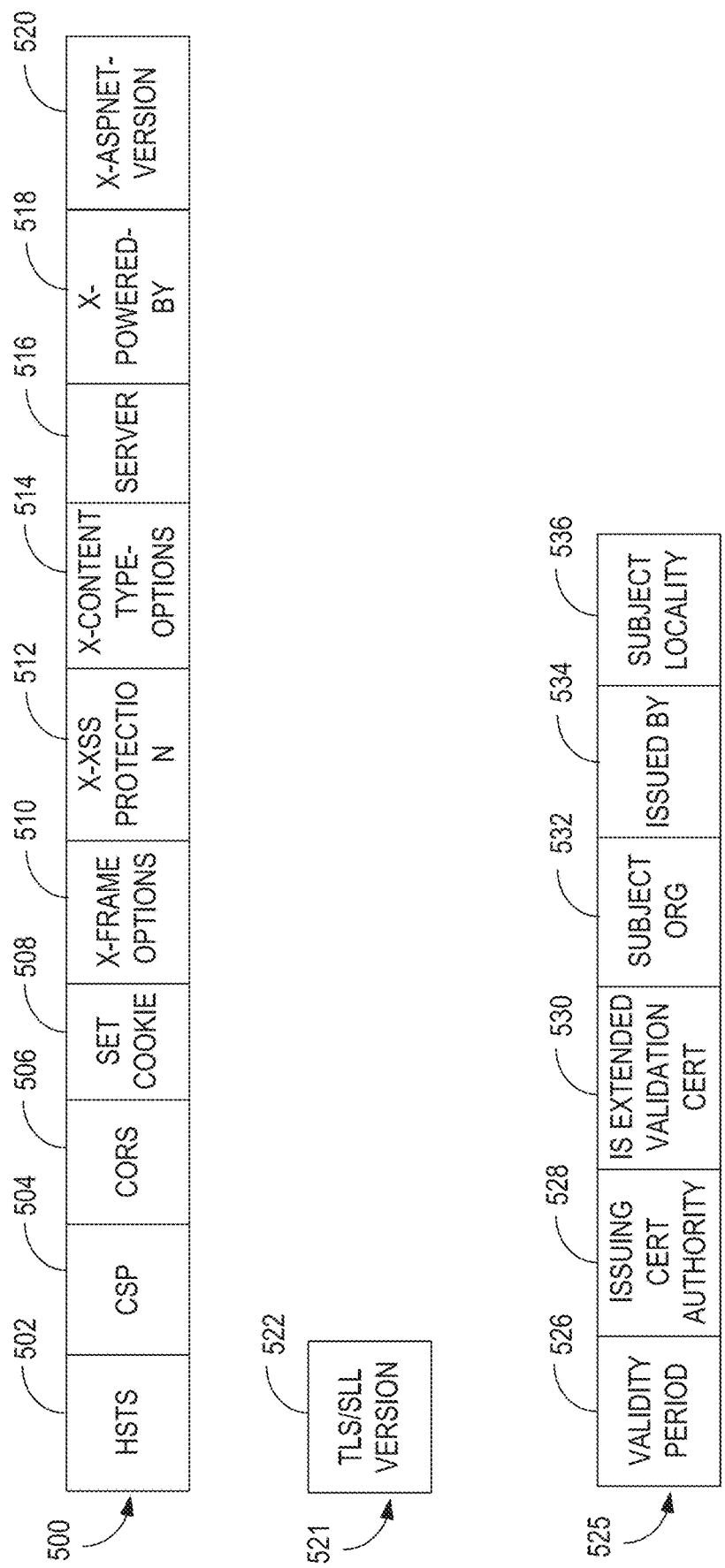
FIG. 5 is a diagram showing example portions of network messages, such as any one or more of the network messages discussed with respect to FIG. 1.

FIG. 5 is a diagram showing example portions of network messages, such as any one or more of the network messages 106a-d discussed above. Example message portion 500 includes a HTTP strict transport security (HSTS) header 502, a content security policy (CSP) header 504, a cross origin resource sharing (CORS) header 506, a set-cookie header 508, an X-frame-options header 510, a X-XSS-Protection header 512, an X-Content-Type-Options header 514, a server header 516, an X-Powered-By header 518, and an X-AspNet-Version header 520. The HSTS header 502 indicates whether the web server providing the message portion 500 only supports connections using HTTPS. The HSTS header 502 includes, in some embodiments, one or more other fields indicating a maximum connection age, whether subdomains are included, and preload. Some embodiments provide a minimum allowed time period of six months for the maximum connection age indication. One or more of these indications are considered, in at least some embodiments, when determining an intermediate risk score to assign to the HSTS header 502. If a web server does not utilize HTTP strict transport security (identified via a http strict-transport-security (HSTS) header), an attacker is not prevented from performing a man in the middle attack, since the attack is able to intercept HTTP requests.

The CSP header 504 indicates whether content can only be loaded in a policy. If content security policy is enabled, Cross-Site scripting (XSS) and HTML injection attacks are prevented. A CSP header 504 provides a URL whitelisting capability. Some evidence indicates 84% of security vulnerabilities are exploited via cross site scripting. In some embodiments, if the CSP header 504 is set to "default-src 'self'", this indicates that content is only loaded from a current domain.

The cross-origin resource sharing (CORS) header 506 indicates whether 3rd party access to a given resource is allowed. The CORS header 506 provides exclusions to a Same Origin policy in a document object model (DOM) and global JavaScript objects. In some embodiments, a setting in the CORS header 506 limits an ability of other web servers or web sites to access content on a different page.

The set-cookie header 508 defines how cookies are protected. Two attributes are defined by the set-cookie header 508. A "secure" attribute only allows cookie transfer via HTTPS if set. A "HTTPOnly" attribute prevents JavaScript access to cookie data. Cookies with high security implications, such as session cookies, should set both the "secure" and "HTTPOnly" attributes.

The X-frame-options header 510 defines whether loading of iFrames is allowed or not. If loading of iFrames is not allowed, this can prevent "ClickJacking" attempts. Clickjacking can occur when a malicious application loads a target application into an invisible iFrame, which is typically hidden under a legitimate control, such as a button, or other interaction surface. A selection of the legitimate control are captured by the malicious application and forwarded to the iFrame. This can result in potentially unwanted actions by a user on the affected website (e.g. such as an unintended follow/like/or subscribe). Loading of hidden iframes can be also abused maliciously to artificially increase traffic to webpages/videos/ads or to perform DDoS attack on the embedded website. Thus, some embodiments determine a risk score of a web server based on information provided in the X-frame-options header 510.

The X-frame-options header 510 includes three attributes. A DENY attribute defines whether the site can be loaded into any iFrame. A SAMEORIGIN attribute defines whether a page can be loaded into an iFrame if the site domain of the iFrame is equivalent to the site domain of the page. AN ALLOW-FROM attribute defines whether the page is loadable in an iframe from a specified site Uniform Resource Indictor (URI).

The X-XSS-Protection header 512 defines a mode of operation. A zero value of the header 512 disables a cross site scripting filter (e.g. allowing cross site scripting). A value of one in the header 512 enables the filter and indicates a browser is to remove JavaScript and other run time scripting from the page. A value of two (2) blocks the page from rendering if a cross site scripting attack is identified.

The X-Content-Type-Options header 514 defines two attributes. A content-disposition attribute, if set, forces a browser to prompt before downloading a file. An X-Download-Options attribute, if set, forces a file to be saved locally before it is opened. The X-Content-Type-Options header provides some protection against Mime sniffing. Mime sniffing vulnerabilities occur when a website provides for a user to upload content. The ability to upload content can be misused by a nefarious user. For example, a nefarious user can disguise a particular file type as something else. This provides an opportunity to perform cross-site scripting, which can compromise the website. The X-Content-Type-Options prevents these types of attacks by disabling MIME sniffing functionality of popular browser applications. This requires the browser to use a MIME type send via the origin server.

The server header 516 provides information about the server hosting a website (e.g. web server computer 104). Providing this information potentially exposes the site to hackers, as the information about the server can be used to craft exploits based on known vulnerabilities of the particular type of server. Some of the disclosed embodiments increase a risk assessment of a web server if the server header 516 includes detailed description of the server hosting the website. Furthermore, the risk assessment is adjusted based on version information included in the server header 516. For example, if the server header 516 indicates a version of the server that includes known vulnerabilities, this increases the relative risk in at least some embodiments. Server headers indicating up to date version information reflecting a version without known vulnerabilities provides a relative decrease in the relative risk of accessing the web server.

The X-Powered-By header 518 indicates a web framework used by the website and a version of the framework. Information included in the X-Power-By header 518 provides information to a nefarious actor who may use the information to exploit one or more known vulnerabilities in the indicated framework/version.

The X-AspNet-Version header 520 indicates whether an ASP.NET framework is servicing the website. This information can be used by a nefarious actor to exploit any known vulnerabilities in a framework/version identified by the X-AspNet-Version header 520.

The cypher message portion 521 includes a Transport Layer Security (TLS)/Secure Sockets Layer (SSL) header 522. An encryption standard in use can be obtained from a data stream once the connection is established. The TLS/SSL header 522 indicates which version of TLS is in use. Possible values include 1.0, 1.1, 1.2, or 1.3, among others. Each version carried with it a different level of cipher vulnerability.

The certificate features information 525 includes a variety of information regarding a certificate used by a web site. In some embodiments, a client device (e.g. client device 102a) makes a request to a server computer to retrieve a certificate. The certificate features information 525 are then derived, in at least some embodiments, by the client device based on the retrieved certificate. In some embodiments, a browser extension (e.g. extension 206 of FIG. 2) makes the certificate request and obtains the certificate from the web server.

The certificate features information includes a validity period information 526, issuing certificate authority information 528, is extended validation certificate information 530, a subject organization information 532, an issued by information 534, and a subject locality information 536. The validity period information 526 indicates an expiration date of a site certificate. Certificates that are expired or will be expiring soon are an indicator of how well the website is managed and maintained. This information is considered, by some embodiments, when determining a risk score for the web server.

The issuing certificate authority information 528 indicates an entity issuing the certificate. Some entities have better reputations relative to other entities. Some of the disclosed embodiments determine a risk score of a web site based, at least in part, on the entity issuing its certificate.

The Extended validation certificate indicates whether a legal entity controlling the website has been verified by the certificate authority. Such verification increases trust in the legal entity controlling the website. Some embodiments consider this information when determining a risk score of the web site.

The subject organization information 532 can be compared against an indication of an organization managing the website. If the two organizations match, some embodiments use the match to determine a reduced risk of the website. If the two organizations do not match, some embodiments generate a risk score indicating relatively increased risk as a result of a lack of match.

The issued by information 534 indicates a certificate authority issuing the certificate. Some certificate authorities vet their customers well while other certificate authorities have a less mature process. Some of the disclosed embodiments adjust a risk score of a web site based on the issued by information.

The subject locality information 536 indicates a locality for the certificate. Some localities have a larger amount of percentage of fraudulent activity. Thus, some of the disclosed embodiments adjust a risk score of a web site based on the subject locality information 536.

Figure 6:
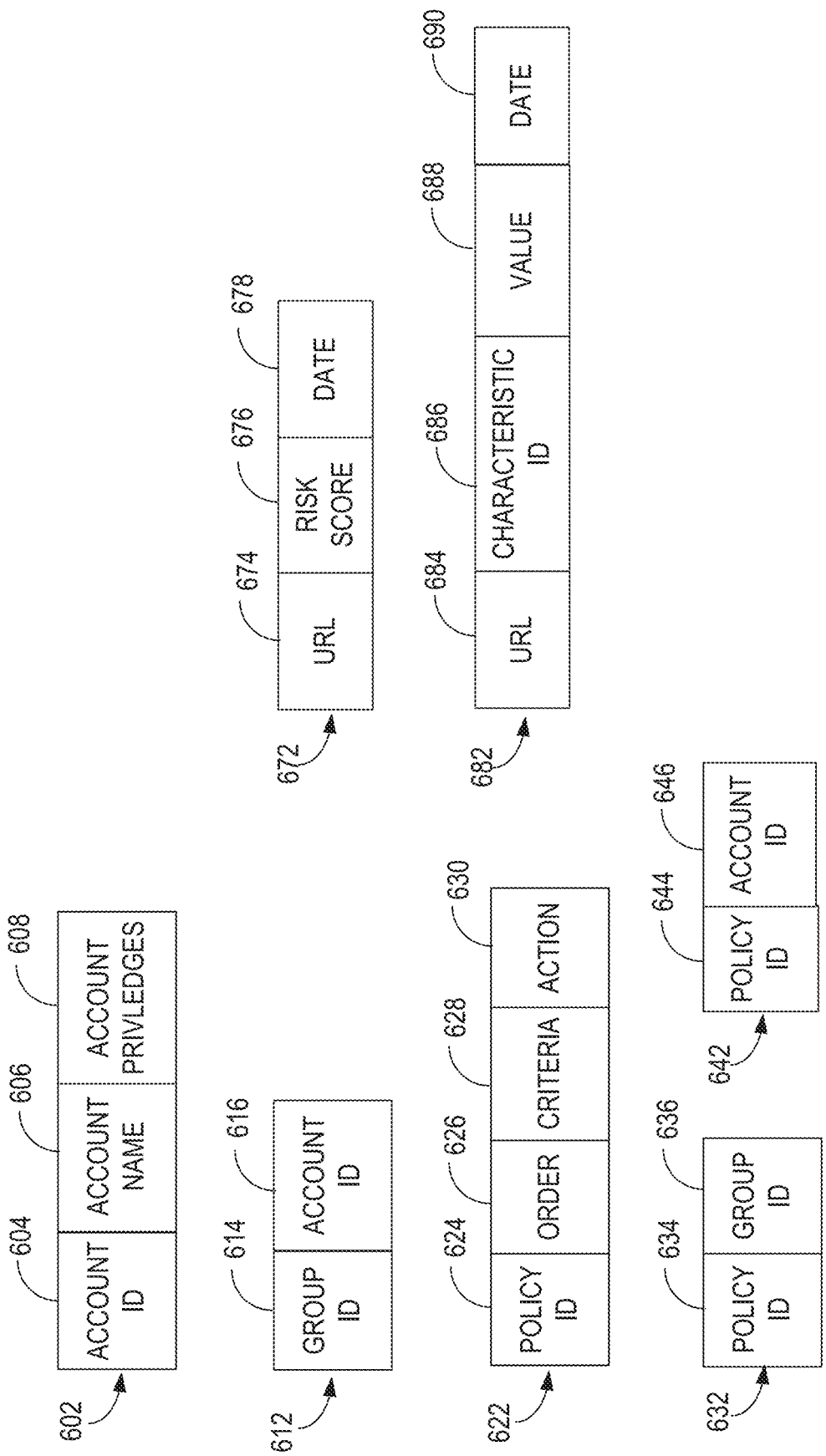
FIG. 6 shows example data structures implemented in one or more of the disclosed embodiments.

FIG. 6 shows example data structures implemented in one or more of the disclosed embodiments. While the data structures of FIG. 6 are illustrated and discussed as relational database tables, the disclosed embodiments utilize any data structures known in the art. For example, various embodiments utilize unstructured data stores, linked lists, arrays, or any other data structure to implement the features discussed here.

FIG. 6 shows an example account table 602, group table 612, policy table 622, group policy table 632, an account policy table 642, web server risk table 672, and web server characteristics table 682. The account table 602 includes an account identifier field 604, account name field 606, and account privileges field 608. The account identifier field 604 uniquely identifies a particular computer account, such as an account logged in on a client device, such as the client device 102a or the client device 102b. The account name field 606 defines a name of the account. The name defined by the account name field 606 is specified, in at least some embodiments, when logging into the account to establish a session under the account. The account privileges field 608 defines access levels or privileges provided to a session that is logged into this account. The fields illustrated in the account table 602 are just examples, and implementations meeting the disclosed embodiments may include more fields not provided as examples here.

The group table 612 includes a group identifier field 614 and an account identifier field 616. The group identifier field 614 uniquely identifies a group. The account identifier field 616 indicates the identified account is included in the group identified by the group identifier field 614. A group including multiple accounts will have multiple "rows" in the group table 612, each "row" identifying a different account included in the group.

The policy table 622 includes a policy identifier field 624, an order field 626, a criteria field 628, and an action field 630. The policy identifier field 624 uniquely identifies a security policy. The order field 626 identifies an order in which multiple "rows" of the policy table 622 for the same policy are to be evaluated. The criteria field 628 identifies one or more criterion associated with the policy (identified via policy identifier field 624). The one or more criterion defined by the criteria field 628 can specify conditions for any one or more of the headers or information described above with respect to FIG. 5. The one or more criterion defined by the criteria field 628 further specify conditions for the risk score determined by the method 700, discussed below with respect to FIG. 7. Furthermore, the one or more criterion defined by the criteria field 628 further specify, in at least some embodiments, conditions for one or more of a type of server operating system (e.g., name and/or version), type of http server application (e.g. name and/or version), type of web application (e.g. name and/or version), type of interpreted language implementing the web application (e.g. name and/or version), type of plugs/themes and/or extensions used by the web application (e.g. name and/or version of each), type of client side framework/libraries used (e.g. name and/or version of each framework and/or library). The action field 630 defines an action to take if the criterion defined by the criteria field 628 evaluates to a true value. The action field 630 can define an action such as unconditionally block access to the web server, generating a prompt indicating the risk score and requesting input whether to continue or to stop accessing the web server, or other actions.

The group policy table 632 includes a policy identifier field 634 and a group identifier field 636. The policy identifier field 634 uniquely identifies a particular policy, for example, by cross referencing with the policy identifier field 624. The group identifier field 636 identifies a group to which the policy (identified via policy identifier field 634) is applied. Some embodiments consult the group policy table 632 after consulting the account policy table 642 (if no policy specific to the account is found).

The account policy table 642 includes a policy identifier field 644 and an account identifier field 646. The policy identifier field 644 uniquely identifies a policy, for example, by cross-referencing the policy identifier field 644 with the policy identifier field 624. The account identifier field 646 identifies an account to which the identified policy (e.g. via policy identifier field 644) is applied. The account identifier field 646 can be cross-referenced, in some embodiments, with the account identifier field 604.

The web server risk table 672 includes a URL field 674, a risk score field 676, and a date/time field 678. The URL field 674 identifies a URL. The URL includes address information that identifies a web server. For example, the URL can identify the web server via IP address or hostname in various embodiments. The risk score field 676 defines a risk score previously determined by a client computer. As discussed above, in some embodiments, after a client device determines a risk score of a web server computer (e.g. web server computer 104), the client device writes the determined risk score to a web server risk data store (e.g. web server risk data store 122), sharing the information with other client computers as needed. Some embodiments of the web server risk data store include the web server risk table 672, or a similar data structure. The web server risk table 672 also includes a data/time field 678, indicating a date/time when the risk score field 676 was last updated. A client computer evaluates, in at least some embodiments, how recent any information stored in the web server risk table 672 is, before deciding whether to rely on it to assess a web server risk, or to generate a new risk score itself after exchanging some data with the web server, as discussed above.

The web server characteristics table 682 includes a URL field 684, characteristics id field 686, value field 688, and a date/time field 690. The URL field 684 defines a URL that identifies a web server, for example, via address information such as an IP address or hostname as discussed above. The characteristic identifier field 686 identifies a particular characteristic of a web server that is relevant to the web server's security and/or determination of a risk score for that web server. The value field 688 defines a value for a particular characteristic identified by the characteristic identifier field 686. The date/time field 690 defines a date when the characteristic value was last updated. In some embodiments, the web server characteristics table 682 is included in the web server risk data store 122, discussed above.

Figure 7:
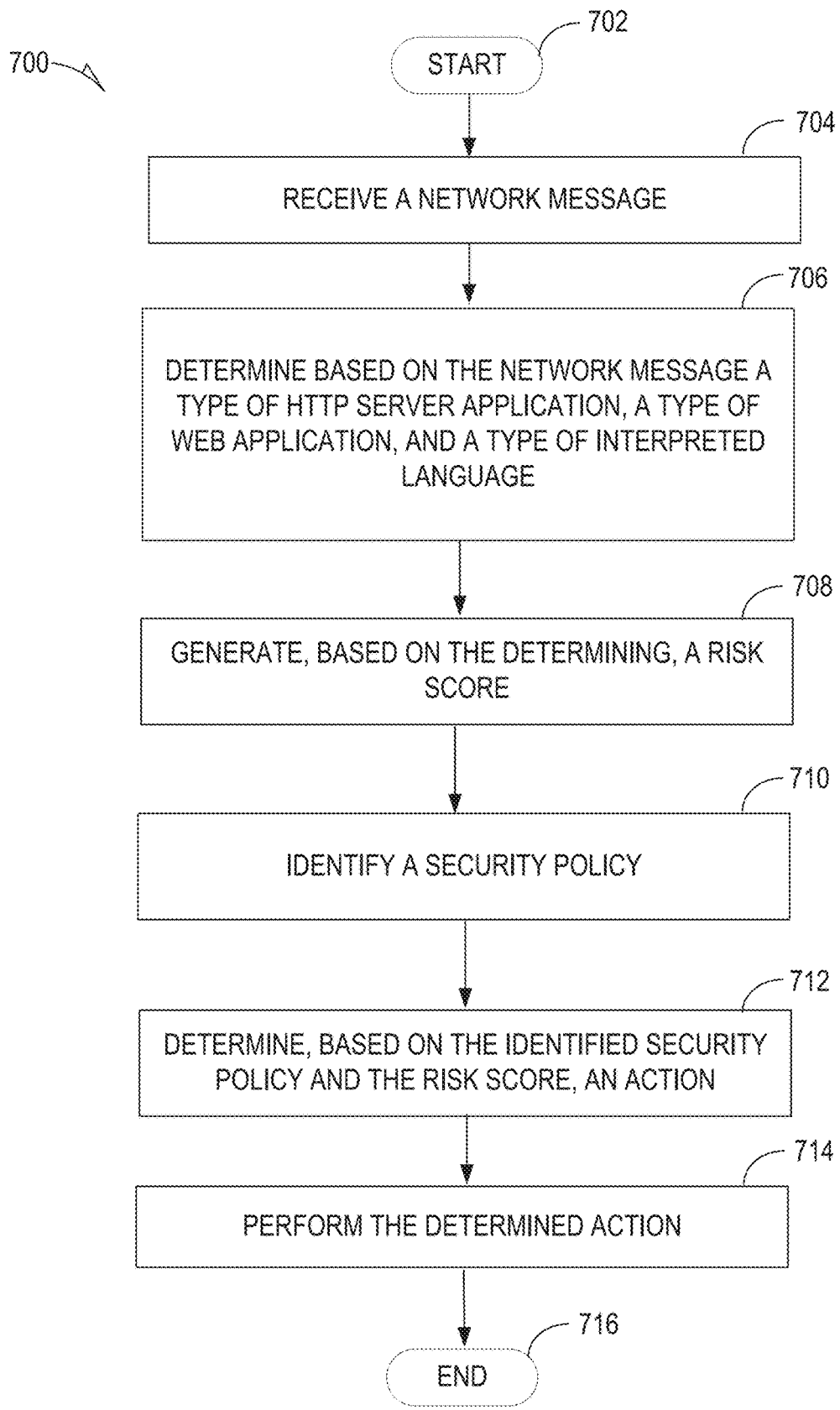
FIG. 7 is a flowchart of a method for determining a risk of accessing a website.

FIG. 7 is a flowchart of a method for determining a risk of accessing a website. The website is hosted by a web server computer, such as web server computer 104, discussed above with respect to FIG. 1 and FIG. 2.

In some embodiments, one or more of the functions discussed below with respect to FIG. 7 is performed by hardware processing circuitry (e.g. processor 902, discussed below). In some embodiments, instructions (e.g. instructions 924 discussed below) stored in an electronic memory (e.g. 904 and/or 906 discussed below) configure the hardware processing circuitry to perform one or more of the functions discussed below. In some embodiments, one or more of the functions discussed below with respect to FIG. 7 are performed by a client device (e.g. client device 102*a* or client device 102*b*), and/or by an extension (e.g. extension 206 discussed below with respect to FIG. 2). A device performing the method 700 is referred to below, in some cases, as an "executing device."

After start operation 702, the method 700 moves to operation 704, which receives a network message. As discussed above, the network message is, in some embodiments, a message transmitted by a web server computer and received by a client device (e.g. client device 102*a* or client device 102*b*). The network message is an http response message in some embodiments. Thus, in some embodiments, operation 704 includes generating and transmitting an http request message that requests or one or more resources included in the network message, from the web server computer. Alternatively, the network message is an error message indicating said resource is not available or another error condition.

Note that in some embodiments, performance of operation 704 is conditional on whether an existing risk assessment for a web server computer is already available. For example, as discussed above, some embodiments check a web server risk data store (e.g. web server risk data store 122) to determine if a risk assessment has already been performed for a web server. Thus, in these embodiments, upon receiving input requesting data from a web server (e.g. entry of a URL within an address window of a browser), some embodiments query the web server risk data store to determine if a recent risk assessment is available (e.g. query the web server risk table 672, and if the web server is identified via the URL field 674, check the date/time field 678 to confirm the risk assessment is recent enough (e.g. within a predefined threshold period of time). In embodiments that identify recent risk information for a web server, the method 700 moves to operation 710 discussion below, and avoids performance of operations 704, 706, and 708.

Some embodiments of operation 704 intercept an http request. For example, an extension (e.g. extension 206) is configured, in some embodiments, via an API (e.g. API 207), to intercept an http request generated by a browser application (e.g. browser application 202) or another application performing network communication. Based on the intercepted http request, operation 704 detects cookie information included in the http request. Operation 704 evaluates, in some embodiments, whether the cookie information indicates a secure flag, an http_only flag, a session flag, or a samesite flag.

Figure 8:
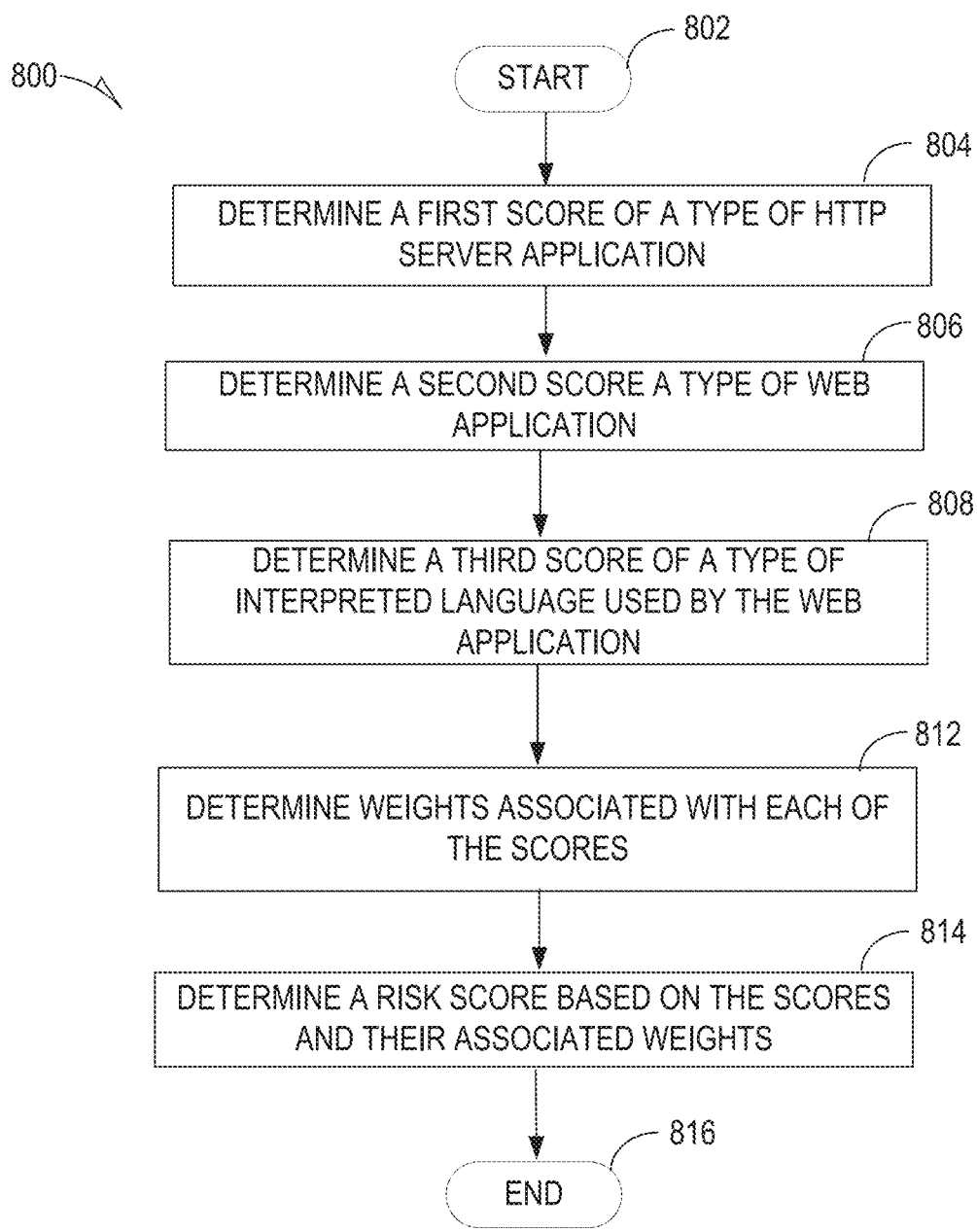
FIG. 8 is a flowchart of an example method for determining a risk score.

In operation 706, the network message is parsed or otherwise decoded to determine one or more of a type of http server application indicated by the network message, a type of web application indicated by the network message, and a type of interpreted language indicated by the network message. The type of http server application indicates the http server application that transmitted the received network message. The type identifies, in some embodiments, a name of the http server application (e.g. Apache, Internet Information Server (IIS), Sun Java System Web Server, nginx, google web server (GWS), etc.), and/or a version of the http server application (e.g. 1.0, 1.3, etc.). The type of interpreted language indicates a language that is used to implement the web server. For example, the type of interpreted language identifies in some embodiments, whether the interpreted language is PHP, C#, Ruby, Python, etc. The type of web application identifies a web application that generated the network message. For example, the type of web application identifies, for example, the web application 204 discussed above with respect to FIG. 2. The type of web application can include a name of a web application and/or a version of the web application. FIG. 8 provides one example implementation of operation 706. In general, the disclosed embodiments rely on parsing of individual http headers, and/or signature-based matching of content provided by a web server computer component to identify particular web server computer components, such as http servers, web applications, scripting or interpreted languages, frameworks, libraries, and other properties of the web server. As discussed above, some embodiments maintain one or more signature types, such as master signatures (e.g. defined by master signature table 431 in some example embodiments) URL sequence signatures (e.g., defined by URL signature table 351 in some embodiments), DOM signatures (e.g. defined by DOM signature table 361 in some example embodiments), content-based signatures (e.g. defined by content signature table 391 in some example embodiments), or JavaScript Object signatures (e.g. defined by JavaScript Object Table 421 in some example embodiments).

In some embodiments, the JavaScript Object Table 421 defines a JavaScript expression that is injected into a document retrieved from a web server computer (e.g. defined by one or more network messages received from the web server computer). When the injected Java Script expression is executed, it queries one or more attributes or parameters of its run time environment, and provides this information back to the disclosed embodiments. For example, in some embodiments, the injected Java Script determines the presence of a framework or library, and/or a version of a framework or library (if present).

If these one or more signatures match content obtained from the web server computer via one or more network messages, they identify particular components in use by the web server computer. As described above with respect to master signature table 431, some signatures implement conditional logic by being structured as multiple levels. In these embodiments, the multi-level signature is first evaluated at its root signature (e.g. in some embodiments, a root signature is identified via a parent signature field 435 set to a predefined value indicating a root, such as zero (0)). If this root signature evaluates to a true value, any child signatures are evaluated. Any child signatures that evaluate to true values, then their child signatures are also evaluated. This process repeats until either a signature evaluates to false, or a signature without children evaluates to a true value. Such a signature defines the component, and any properties of the component that are further identified via the signature. In some cases, a parent signature identifies a broader category of component (e.g. a particular framework type), while a child signature identifies a particular version of the identified component (e.g. version 2.1 of the particular framework type).

Some embodiments of operation 708 decode the network message (and/or additional network messages to identify any one or more of the characteristics discussed above with respect to FIG. 5.

In operation 708, a risk score is generated based on the determining of operation 706. Some embodiments of operation 708 assign a component score to each of the data determined in operation 706. The risk score is then determined based on the component scores. In some embodiments, each of the component scores is determined based on a structure similar to the risk score table 396, discussed above with respect to FIG. 3B. In other words, these embodiments maintain a mapping between particular web server computer components and a level of risk introduced by the particular component. Various embodiments may aggregate the component scores, for example, via addition or multiplication to determine the risk score. In some embodiments. Some embodiments assigning different weights to the different component scores, with the risk score discounting each of the component scores based on their assigned weights. One example implementation of operation 708 is discussed below with respect to FIG. 7. Some embodiments of operation 708 determine or adjust the risk score based on cookie information detected by operation 704 as discussed above.

In operation 710, a security policy is identified. In some embodiments, the security policy is identified based on one or more of an account, group, or device under which the method 700 is being performed. For example, as discussed with respect to FIG. 6, a policy can be defined for a particular account (e.g. via the account policy table 642), and/or a particular group (e.g. via the group policy table 632). Some embodiments first check to see if a policy is defined for an account. A session is established, in some embodiments, under an account, with the session performing the method 700. If a policy is defined for the account (e.g. via account policy table 642), that policy is identified in operation 710. If no policy is identified for the account, some embodiments then check for a group policy (e.g. via group policy table 632 and/or the group table 612—to determine which group or groups the account belongs to).

The identified security policy indicates one or more criterion that are applied to the risk score and/or component scores to determine an action, as discussed below.

In operation 712, an action is determined based on the risk score and the identified security policy. For example, as discussed above with respect to FIG. 6, some embodiments associate an action with one or more criterion of a policy (e.g. via criteria field 628 associated with a policy defined by policy identifier field 624). If the one or more criterion are met, the determined action is performed (e.g. in some embodiments, the action is identified by action field 630 for a criterion (defined by field 628) that evaluates to a true value) by operation 714.

Actions can include, in various embodiments, blocking access to a resource located on the website, generating a prompt or display control that confirms that access should be attempted, with the prompt displaying one or more indicators of risk associated with the access, or other actions. In some embodiments, the action includes displaying or causing display of any one or more of the user interfaces described above with respect to FIG. 4A and/or FIG. 4B. In some embodiments, the display of the user interface(s) is conditional on criterion defined by the security policy and the risk score, which in some embodiments, is evaluated by the criterion.

In some embodiments, the action is to simply submit or otherwise allow further processing of data from the web server by a client device, or any device performing the method 700. Some embodiments block only a portion of a page provided by an http response. For example, some embodiments detect risk associated with a particular http frame, such as an iframe, defined by one of the network messages (e.g. 106a-d). Some embodiments prevent data included in the identified frame from being further processed by the executing device, but allow other portions of the page to be further processed and/or displayed.

After operation 714 completes, the method 700 moves to end operation 716.

Some embodiments of the method 700 write the determined risk score to a web server risk data store. As discussed above, the web server risk data store is accessible via a network, such as the Internet in some embodiments, and provides for sharing of web server risk information with other devices. In some embodiments, not only the risk score determined in operation 708 is written to the web server risk data store, but intermediate information used to generate the risk score is also written. For example, one or more of the web server characteristics discussed above with respect to FIG. 5 is written to the web server risk datastore in various embodiments. In some embodiments, intermediate scores upon which the risk score of operation 708 are also written to the web server risk data store. For example, any intermediate scores computed by the modules 308a-g discussed above are written to the web server risk data store in some embodiments. Similarly, as discussed below, any one or more of the first score, second score, or third score discussed below with respect to FIG. 8 are written to the web server risk data store.

FIG. 8 is a flowchart of an example method for determining a risk score. In some embodiments, one or more of the functions discussed below with respect to FIG. 7 is performed by hardware processing circuitry (e.g. processor 902, discussed below). In some embodiments, instructions (e.g. instructions 924 discussed below) stored in an electronic memory (e.g. 904 and/or 906 discussed below) configure the hardware processing circuitry to perform one or more of the functions discussed below. In some embodiments, one or more of the functions discussed below with respect to FIG. 7 are performed by a client device (e.g. client device 102a or client device 102b), and/or by an extension (e.g. extension 206 discussed below with respect to FIG. 2). Some embodiments of operation 708, discussed above with respect to FIG. 7, include one or more of the functions discussed below with respect to FIG. 8 and the method 800.

After start operation 802, the method 800 moves to operation 804, where a first score is determined for a type of http server application. For example, as discussed above with respect to FIGS. 1, 2, 3B, 3C, and/or 5, some embodiments parse or otherwise decode one or more network messages received from a web server computer to determine a type of http server application communicating with a device performing the method 800. Some types of http servers (e.g. the name of the http server, such as Apache or IIS, and/or the version of the http server) are more vulnerable than others.

For example, as discussed above with respect to FIGS. 3B and/or 3C, in some embodiments, one or more URL, DOM xpath patterns, JavaScript Object, or Content based signatures are employed by at least some of the disclosed embodiments to identify a web server computer component, such as a type of http server application. For example, in some embodiments, a content signature defined by a content signature table (e.g. content signature table 391) is used to identify the type of web server application. Some embodiments evaluate one or more regular expressions against one or more network messages received from the web server to determine the type of web server serving the web pages and running on the web server computer.

Some embodiments of operation 804 consult a vulnerabilities data store (e.g. vulnerability data store 120) to determine a relative vulnerability of the type of http server application, and assign the first score to a value that is based on the relative vulnerability.

In operation 806, a second score for a type of web application is determined. As discussed above, some embodiments parse or otherwise decode a network message received from a web server (e.g. web server application 208 and/or web server computer 104) to determine a type of web application that generated the network message. Some embodiments utilize a URL signature to identify the type of web application. As discussed above, in some embodiments, the vulnerabilities data store defines URL signatures which define sequences of URLs that are retrieved by particular web applications. Some of the disclosed embodiments monitor a sequence of URLs fetched or otherwise received by a web application, and compare the monitored or observed sequence to URL sequences of known web application types (e.g. defined by the URL signature table 351 and URL sequence table 371. In some embodiments, the URL sequences are specific enough to not only define a type of the web application, but also a particular version of the web application or a version range of the application. For example, one or more versions of a certain web applications exhibit particular URL sequencing behavior while other one or more versions of that certain web application exhibit somewhat different URL sequencing behavior. These differences in the types, order, or even the timing between URL retrievals of a web application are used by at least some of the disclosed embodiments to identify the type of web application and/or its version.

Some embodiments maintain a vulnerabilities data store (e.g. vulnerability data store 120) that maps different types of web applications into different relative levels of security risk (e.g. via the risk score table 396 in some embodiments). Some embodiments then assign the second score to the type of web application associated with a particular http request and/or response based on the determined relative level of risk associated with that type of web application (e.g. a name and/or a version) of web application.

In operation 808, a third score for a type of interpreted language used by the web application (of operation 806) is determined. In some embodiments, the type of interpreted language is determined by decoding an X-Powered-By http header field, and/or an X-Aspnet-Version http header field. Some embodiments determine the type of interpreted language by examining file extension types of URLs retrieved by a web application. For example, if one or more URLs reference files having as .php extension, some of the disclosed embodiments conclude that the type of interpreted language is php. Some embodiments consult the vulnerabilities data store, as discussed above, to determine a level of security risk associated with the determined type of interpreted language (e.g. by referencing the risk score table 396 in some embodiments). The third score is then determined in operation 808 based on this level of security risk.

Operation 812 determines weights associated with each of the first, second, and third scores discussed above. In some embodiments, the weights are dynamically updated based on information received from a configuration data store.

Operation 814 determines a risk score based on one or more security indicators. For example, each of the first, second, and third scores, discussed above, are considered security indicators. Thus, some embodiments determine the risk score based on one or more of the first, second, and third scores, along with their associated weights. Some embodiments discount each score by its associated weight, and then aggregate the discounted scores. Other embodiments utilize an alternative method of aggregating the first, second, and third scores.

Other security indicators are also considered in at least some embodiments. For example, some embodiments determine the risk score based on one or more of the headers and/or features and/or attributes discussed above with respect to FIG. 5.

Some embodiments analyze one or more network messages received from a web server computer to identify one or more DOM xpath patterns. Some embodiments compare the DOM xpath patterns of the network messages to a sequence of DOM xpath patterns. If the patterns of the network messages match a pattern of a known framework, library, web application, or other characteristics of a web server computer, a risk score associated with the identified characteristic is generated.

Some embodiments examine a referrer policy and/or a feature policy indication included in a http response. The risk score is based, in these aspects, on whether the referrer-policy is set to an unsafe-url. Operation 814 also adjusts the risk score, in some embodiments, based on whether an http response header or a page defined by the http response and analyzed by the method 800 indicates a request for access to a microphone and/or camera of the executing device (e.g. client device). Some embodiments adjust the risk score based on whether an HSTS header included in an http response message specifies use of encrypted connections or not. Some embodiments adjust the risk score based on whether an X-XSS-Protection header included in an http response message enables an XSS filter.

Some embodiments analyze document object model (DOM) content included in an http response from the web server, and adjust the risk score based on the DOM content. As discussed above, some embodiments adjust the risk score based on characteristics of a digital certificate provided by the web server (e.g. any of the certificate attributes discussed above with respect to FIG. 5 and certificate features information 525.

After operation 814 completes, method 800 moves to end operation 816.

Figure 9:
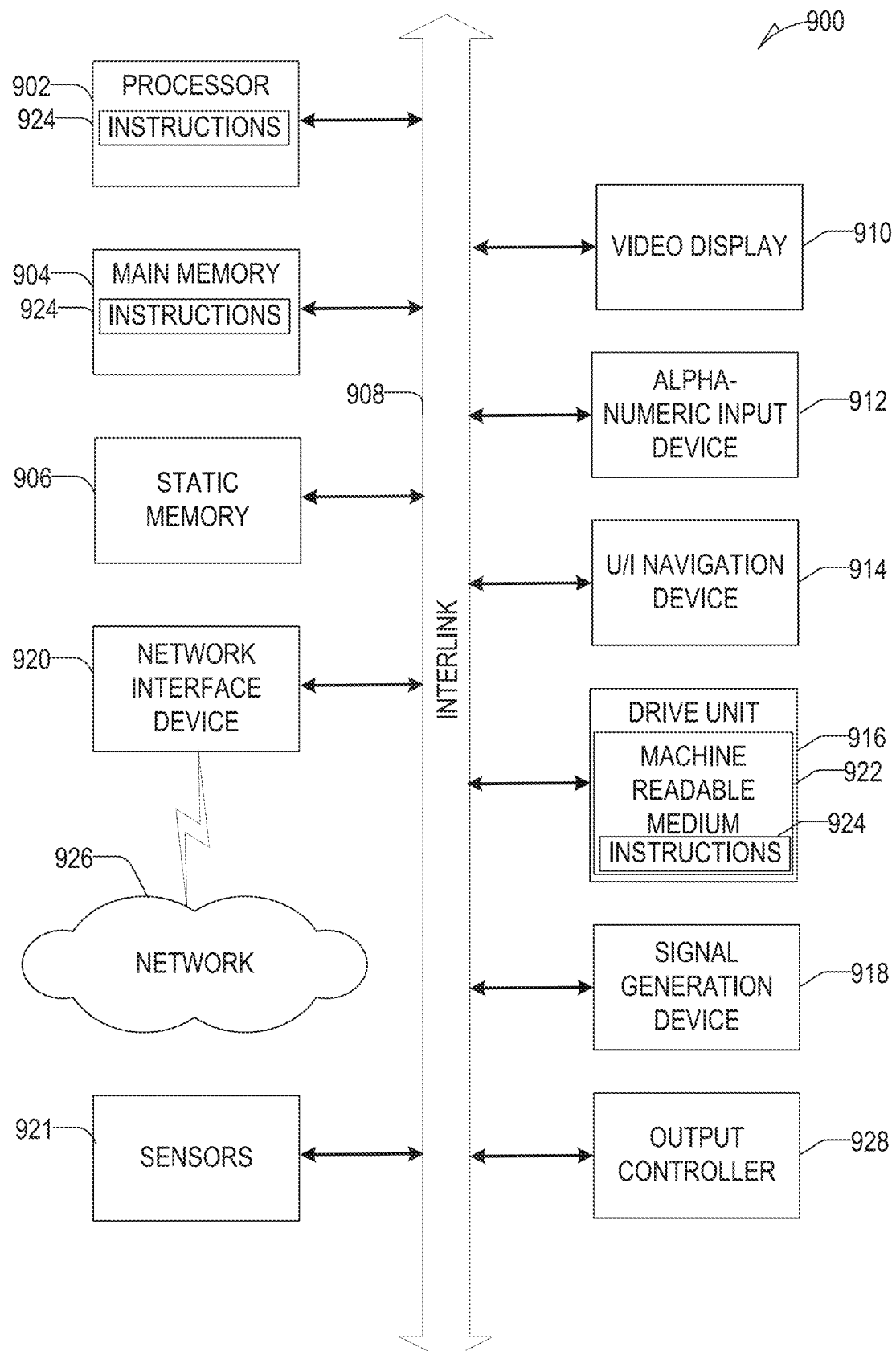
FIG. 9 illustrates a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. In alternative embodiments, the machine 900 may operate as a standalone device or are connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 900 may perform one or more of the processes described above with respect to FIGS. 1-8 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software may reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 are a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or another sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 924 may further be transmitted or received over a communications network 926 using a transmission medium via the network interface device 920. The machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

Examples, as described herein, may include, or may operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a method performed by a client device, comprising: receiving a network message from a web server; determining based on the network message, a type of hyper-text transfer protocol (http) server application of the web server, a type of web application, and a type of interpreted language; generating, based on the determining, a risk score of the web server; identifying a security policy; determining, based on the identified security policy and the risk score, an action; and performing the determined action.

In Example 2, the subject matter of Example 1 optionally includes wherein the determining of the type of web application comprises; identifying a sequence of uniform resource locators (URLs), comparing the sequence of URLs to URL signatures of known web applications; determining, based on the comparing, a matching URL signature; and determining, based on the matching URL signature, the type of web application.

In Example 3, the subject matter of any one or more of Examples 1-2 optionally include determining, based on the network message, a client executable framework or library, wherein the generating of the risk score is further based on the determined client executable framework or library.

In Example 4, the subject matter of any one or more of Examples 1-3 optionally include identifying, based on one or more network messages including the network message, a sequence of document object model (DOM) xpath patterns; comparing the sequence of DOM xpath patterns to DOM signatures of a known plug-in, theme, or extension, determining, based on the comparing, a matching DOM signature; and determining, based on the matching DOM signature, a plug-in, theme.

In Example 5, the subject matter of any one or more of Examples 1-4 optionally include injecting an expression into a document defined by the network message; causing the expression to be evaluated; and determining, based on the evaluation, a presence of or a version of a plug-in, theme, or a library.

In Example 6, the subject matter of any one or more of Examples 1-5 optionally include decoding a server header of the network message; second determining, based on the decoded server header, an operating system of the web server, wherein the generating of the risk score is further based on the second determining.

In Example 7, the subject matter of any one or more of Examples 1-6 optionally include wherein performing the determined action comprises displaying a user interface on the client device, the user interface configured to display information derived from the risk score.

In Example 8, the subject matter of Example 7 optionally includes wherein the user interface is configured to display a control, the control configured to submit the network message for further processing by the client device.

In Example 9, the subject matter of Example 8 optionally includes configuring, based on the security policy, the user interface to display the control.

In Example 10, the subject matter of any one or more of Examples 1-9 optionally include wherein performing the determined action comprises blocking further processing of the network message by the client device.

In Example 11, the subject matter of Example 10 optionally includes blocking an http frame associated with the network message.

In Example 12, the subject matter of any one or more of Examples 1-11 optionally include determining a version of the web application; and comparing the version of the web application against a vulnerability data store, wherein the risk score is further based on the comparing.

In Example 13, the subject matter of any one or more of Examples 1-12 optionally include wherein the network message is an http response message, and the risk score is based on a security indicator of the http response message, the security indicator including one or more of a content security policy header, an X-frame-options header, an X-XSS-Protection header, a server header, a http strict-transport-security (HSTS) header, an X-content-Type-Options header, a referrer policy, or a feature policy.

In Example 14, the subject matter of Example 13 optionally includes wherein the security indicator indicates one or more of whether mime-sniffing is disabled by the http response, wherein the security indicator indicates whether the referrer policy is set to unsafe-url, whether the http response header indicates a request for access to a microphone or camera, whether the HSTS header specifies use of encrypted connections, whether the X-XSS-Protection header enables an XSS filter.

In Example 15, the subject matter of any one or more of Examples 13-14 optionally include wherein the security indicator is further based on document object model (DOM) content included in the http response message.

In Example 16, the subject matter of any one or more of Examples 13-15 optionally include wherein the security indicator is further based on a digital certificate identified by the http response message.

In Example 17, the subject matter of any one or more of Examples 1-16 optionally include Intercepting, by the client device, an http request; and determining, by the client device and based on a cookie included in the http request, a second security indicator, wherein the action is further determined based on the second security indicator.

In Example 18, the subject matter of Example 17 optionally includes wherein the second security indicator is determined based on one or more of a secure flag, http_only flag, session flag, or samesite flag of the cookie.

Example 19 is a system, comprising: hardware processing circuitry; one or more hardware memories storing instructions that when executed configure the hardware processing circuitry to perform operations comprising: receiving a network message from a web server; determining based on the network message, a type of hyper-text transfer protocol (http) server application of the web server, a type of web application, and a type of interpreted language; generating, based on the determining, a risk score of the web server; identifying a security policy; determining, based on the identified security policy and the risk score, an action; and performing the determined action.

In Example 20, the subject matter of Example 19 optionally includes wherein the determining of the type of web application comprises; identifying a sequence of uniform resource locators (URLs), comparing the sequence of URLs to URL signatures of known web applications; determining, based on the comparing, a matching URL signature; and determining, based on the matching URL signature, the type of web application.

In Example 21, the subject matter of any one or more of Examples 19-20 optionally include the operations further comprising determining, based on the network message, a client executable framework or library, wherein the generating of the risk score is further based on the determined client executable framework or library.

In Example 22, the subject matter of any one or more of Examples 19-21 optionally include the operations further comprising: identifying, based on one or more network messages including the network message, a sequence of document object model (DOM) xpath patterns; comparing the sequence of DOM xpath patterns to DOM signatures of a known plug-in, theme, or extension, determining, based on the comparing, a matching DOM signature; and determining, based on the matching DOM signature, a plug-in, theme.

In Example 23, the subject matter of any one or more of Examples 19-22 optionally include the operations further comprising: injecting an expression into a document defined by the network message; causing the expression to be evaluated; and determining, based on the evaluation, a presence of or a version of a plug-in, theme, or a library.

In Example 24, the subject matter of any one or more of Examples 19-23 optionally include the operations further comprising: decoding a server header of the network message; second determining, based on the decoded server header, an operating system of the web server, wherein the generating of the risk score is further based on the second determining.

In Example 25, the subject matter of any one or more of Examples 19-24 optionally include wherein performing the determined action comprises displaying a user interface on the client device, the user interface configured to display information derived from the risk score.

In Example 26, the subject matter of Example 25 optionally includes wherein the user interface is configured to display a control, the control configured to submit the network message for further processing by the client device.

In Example 27, the subject matter of Example 26 optionally includes the operations further comprising configuring, based on the security policy, the user interface to display the control.

In Example 28, the subject matter of any one or more of Examples 19-27 optionally include wherein performing the determined action comprises blocking further processing of the network message by the client device.

In Example 29, the subject matter of Example 28 optionally includes the operations further comprising blocking an http frame associated with the network message.

In Example 30, the subject matter of any one or more of Examples 19-29 optionally include the operations further comprising: determining a version of the web application; and comparing the version of the web application against a vulnerability data store, wherein the risk score is further based on the comparing.

In Example 31, the subject matter of any one or more of Examples 19-30 optionally include wherein the network message is an http response message, and the risk score is based on a security indicator of the http response message, the security indicator including one or more of a content security policy header, an X-frame-options header, an X-XSS-Protection header, a server header, a http strict-transport-security (HSTS) header, an X-content-Type-Options header, a referrer policy, or a feature policy.

In Example 32, the subject matter of Example 31 optionally includes wherein the security indicator indicates one or more of whether mime-sniffing is disabled by the http response, whether the referrer policy is set to unsafe-url, whether the http response header indicates a request for access to a microphone or camera, whether the HSTS header specifies use of encrypted connections, or whether the X-XSS-Protection header enables an XSS filter.

In Example 33, the subject matter of any one or more of Examples 31-32 optionally include wherein the security indicator is further based on document object model (DOM) content included in the http response message.

In Example 34, the subject matter of any one or more of Examples 31-33 optionally include wherein the security indicator is further based on a digital certificate identified by the http response message.

In Example 35, the subject matter of any one or more of Examples 19-34 optionally include the operations further comprising: intercepting, by the client device, an http request; and determining, by the client device and based on a cookie included in the http request, a second security indicator, wherein the action is further determined based on the second security indicator.

In Example 36, the subject matter of Example 35 optionally includes wherein the second security indicator is determined based on one or more of a secure flag, http_only flag, session flag, or samesite flag of the cookie.

Example 37 is a non-transitory computer readable storage medium comprising instructions that when executed configure hardware processing circuitry to perform operations comprising: receiving a network message from a web server; determining based on the network message, a type of hyper-text transfer protocol (http) server application of the web server, a type of web application, and a type of interpreted language; generating, based on the determining, a risk score of the web server; identifying a security policy; determining, based on the identified security policy and the risk score, an action; and performing the determined action.

In Example 38, the subject matter of Example 37 optionally includes wherein the determining of the type of web application comprises; identifying a sequence of uniform resource locators (URLs), comparing the sequence of URLs to URL signatures of known web applications; determining, based on the comparing, a matching URL signature; and determining, based on the matching URL signature, the type of web application.

In Example 39, the subject matter of any one or more of Examples 37-38 optionally include the operations further comprising: determining, based on the network message, a client executable framework or library, wherein the generating of the risk score is further based on the determined client executable framework or library.

In Example 40, the subject matter of any one or more of Examples 37-39 optionally include the operations further comprising: identifying, based on one or more network messages including the network message, a sequence of document object model (DOM) xpath patterns; comparing the sequence of DOM xpath patterns to DOM signatures of a known plug-in, theme, or extension, determining, based on the comparing, a matching DOM signature; and determining, based on the matching DOM signature, a plug-in, theme.

In Example 41, the subject matter of any one or more of Examples 37-40 optionally include the operations further comprising: injecting an expression into a document defined by the network message; causing the expression to be evaluated; and determining, based on the evaluation, a presence of or a version of a plug-in, theme, or a library.

In Example 42, the subject matter of any one or more of Examples 37-41 optionally include the operations further comprising: decoding a server header of the network message; second determining, based on the decoded server header, an operating system of the web server, wherein the generating of the risk score is further based on the second determining.

In Example 43, the subject matter of any one or more of Examples 37-42 optionally include wherein performing the determined action comprises displaying a user interface on the client device, the user interface configured to display information derived from the risk score.

In Example 44, the subject matter of Example undefined optionally includes, wherein the user interface is configured to display a control, the control configured to submit the network message for further processing by the client device.

In Example 45, the subject matter of Example 44 optionally includes the operations further comprising configuring, based on the security policy, the user interface to display the control.

In Example 46, the subject matter of any one or more of Examples 37-45 optionally include wherein performing the determined action comprises blocking further processing of the network message by the client device.

In Example 47, the subject matter of Example 46 optionally includes the operations further comprising blocking an http frame associated with the network message.

In Example 48, the subject matter of any one or more of Examples 37-47 optionally include the operations further comprising: determining a version of the web application; and comparing the version of the web application against a vulnerability data store, wherein the risk score is further based on the comparing.

In Example 49, the subject matter of any one or more of Examples 37-48 optionally include wherein the network message is an http response message, and the risk score is based on a security indicator of the http response message, the security indicator including one or more of a content security policy header, an X-frame-options header, an X-XSS-Protection header, a server header, a http strict-transport-security (HSTS) header, an X-content-Type-Options header, a referrer policy, or a feature policy.

In Example 50, the subject matter of Example 49 optionally includes wherein the security indicator indicates one or more of whether mime-sniffing is disabled by the http response, wherein the security indicator indicates whether the referrer policy is set to unsafe-url, whether the http response header indicates a request for access to a microphone or camera, whether the HSTS header specifies use of encrypted connections, whether the X-XSS-Protection header enables an XSS filter.

In Example 51, the subject matter of Example 50 optionally includes wherein the security indicator is further based on document object model (DOM) content included in the http response message.

In Example 52, the subject matter of any one or more of Examples 50-51 optionally include wherein the security indicator is further based on a digital certificate identified by the http response message.

In Example 53, the subject matter of any one or more of Examples 37-52 optionally include the operations further comprising. Intercepting, by the client device, an http request; and determining, by the client device and based on a cookie included in the http request, a second security indicator, wherein the action is further determined based on the second security indicator.

In Example 54, the subject matter of Example 53 optionally includes wherein the second security indicator is determined based on one or more of a secure flag, http_only flag, session flag, or samesite flag of the cookie.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Various embodiments are implemented fully or partially in software and/or firmware. This software and/or firmware may take the form of instructions contained in or on a non-transitory computer-readable storage medium. Those instructions may then be read and executed by one or more processors to enable performance of the operations described herein. The instructions are in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media, flash memory; etc.

The invention claimed is:

1. A method performed by a client device, comprising:
receiving a series of network messages from a web server, two or more messages of the series of network messages indicating respective uniform resource locators (URLs) associated with a web application;
determining, based on the series of network messages, a type of the web application, including a name of the web application, by:
identifying a sequence of the URLs,
comparing the sequence of the URLs to respective sequences of URLs associated with known web applications,
determining, based on the comparing, a matching sequence of URLs, and
determining, based on the matching sequence of URLs, the type of the web application;
identifying an action based on the type of the web application; and
performing the action.

2. The method of claim 1, further comprising:
determining, based on the series of network messages, a client executable framework or library, wherein the action is further based on the determined client executable framework or library.

3. The method of claim 1, further comprising:
identifying, based on one or more messages of the series of network messages, a sequence of document object model (DOM) xpath patterns;
comparing the sequence of DOM identifiers to DOM signatures of a known plug-in, theme, or extension,
determining, based on the comparing, a matching DOM signature; and
determining, based on the matching DOM signature, a plug-in, theme.

4. The method of claim 1, further comprising:
decoding a server header of a network message of the series of network messages;
determining, based on the decoded server header, an operating system of the web server, wherein the action is further based on the operating system.

5. The method of claim 1, wherein performing the determined action comprises displaying a user interface on the client device, the user interface configured to display information derived from the action.

6. The method of claim 5, wherein the user interface is configured to display a control, the control configured to submit a network message of the series of network messages for further processing by the client device.

7. The method of claim 1, wherein performing the determined action comprises blocking further processing of the series of network messages by the client device.

8. A non-transitory computer readable storage medium comprising instructions that when executed configure hardware processing circuitry to perform operations comprising:
receiving a series of network messages from a web server, two or more messages of the series of network messages indicating respective uniform resource locators (URLs) associated with a web application;
determining, based on the series of network messages, a type of the web application, including a name of the web application, by identifying a sequence of the URLs, comparing the sequence of the URLs to respective sequences of URLs associated with known web applications, determining, based on the comparing, a matching sequence of URLs, and determining, based on the matching sequence of URLs, the type of the web application;
identifying an action based on the type of the web application; and
performing the action.

9. The non-transitory machine readable storage medium of claim 8, wherein the operations further comprise:
determining, based on the series of network messages, a client executable framework or library, wherein the action is further based on the determined client executable framework or library.

10. The non-transitory machine readable storage medium of claim 8, wherein the operations further comprise:
identifying, based on one or more messages of the series of network messages, a sequence of document object model (DOM) xpath patterns;
comparing the sequence of DOM identifiers to DOM signatures of a known plug-in, theme, or extension,
determining, based on the comparing, a matching DOM signature; and
determining, based on the matching DOM signature, a plug-in, theme.

11. The non-transitory machine readable medium of claim 8 wherein the operations further comprise:
decoding a server header of a network message of the series of network messages;
determining, based on the decoded server header, an operating system of the web server, wherein the action is further based on the operating system.

12. A system, comprising:
hardware processing circuitry;
one or more hardware memories storing instructions that when executed configure the hardware processing circuitry to perform operations comprising:
receiving a series of network messages from a web server, two or more messages of the series of network messages indicating respective uniform resource locators (URLs) associated with a web application;
determining, based on the series of network messages, a type of the web application, including a name of the web application, by identifying a sequence of the URLs, comparing the sequence of the URLs to respective sequences of URLs associated with known web applications, determining, based on the comparing, a matching sequence of URLs, and determining, based on the matching sequence of URLs, the type of the web application;

identifying an action based on the type of the web application; and performing the action.

13. The system of claim 12, the operations further comprising:

determining, based on the series of network messages, a client executable framework or library, wherein the action is further based on the determined client executable framework or library.

14. The system of claim 12, the operations further comprising:

identifying, based on one or more network messages of the series of network messages, a sequence of document object model (DOM) xpath patterns;

comparing the sequence of DOM identifiers to DOM signatures of a known plug-in, theme, or extension, determining, based on the comparing, a matching DOM signature; and determining, based on the matching DOM signature, a plug-in, theme or a library.

15. The system of claim 12, the operations further comprising:

injecting an expression into a document defined by a network message of the series of network messages;

causing the expression to be evaluated;

determining, based on the evaluation, a presence of or a version of a plug-in, theme, or a library.

16. The system of claim 12, the operations further comprising:

decoding a server header of a network message of the series of network messages;

determining, based on the decoded server header, an operating system of the web server, wherein the action is further based on the operating system.

17. The system of claim 12, wherein performing the determined action comprises causing display of a user interface, the user interface configured to display information derived from the action.

18. The system of claim 12, the operations further comprising:

determining a version of the web application; and comparing the version of the web application against a vulnerability data store, wherein the action is further based on the comparing.

19. The system of claim 12, wherein a network message of the series of network messages is an http response message, and the action is based on a security indicator of the http response message, the security indicator including one or more of a content security policy header, an X-frame-options header, an X-XSS-Protection header, a server header, a http strict-transport-security (HSTS) header, an X-content-Type-Options header, a referrer policy, or a feature policy.

20. The system of claim 19, wherein the security indicator indicates one or more of whether mime-sniffing is disabled by the http response message, whether the referrer policy is set to unsafe-url, whether the http response message indicates a request for access to a microphone or camera, whether the HSTS header specifies use of encrypted connections, or whether the X-XSS-Protection header enables an XSS filter.

* * * * *